(12) United States Patent
Beaufays et al.

(10) Patent No.: US 12,548,549 B2
(45) Date of Patent: *Feb. 10, 2026

(54) ON-DEVICE PERSONALIZATION OF SPEECH SYNTHESIS FOR TRAINING OF SPEECH RECOGNITION MODEL(S)

(71) Applicant: GOOGLE LLC, Mountain View, CA (US)

(72) Inventors: Françoise Beaufays, Mountain View, CA (US); Johan Schalkwyk, Scarsdale, NY (US); Khe Chai Sim, Dublin, CA (US)

(73) Assignee: GOOGLE LLC, Mountain View, CA (US)

( * ) Notice: Subject to any disclaimer, the term of this patent is extended or adjusted under 35 U.S.C. 154(b) by 404 days.

This patent is subject to a terminal disclaimer.

(21) Appl. No.: 17/983,671

(22) Filed: Nov. 9, 2022

(65) Prior Publication Data

US 2023/0068897 A1     Mar. 2, 2023

Related U.S. Application Data

(63) Continuation of application No. 17/082,518, filed on Oct. 28, 2020, now Pat. No. 11,545,133.

(Continued)

(51) Int. Cl.
*G10L 13/02*        (2013.01)
*G10L 13/033*       (2013.01)
(Continued)

(52) U.S. Cl.
CPC .......... *G10L 13/047* (2013.01); *G10L 13/033* (2013.01); *G10L 13/10* (2013.01)

(58) Field of Classification Search
None
See application file for complete search history.

(56) References Cited

U.S. PATENT DOCUMENTS 11,545,133 B2 *  1/2023  Beaufays ................ G10L 13/10
2004/0243412 A1  12/2004  Gupta
(Continued)

FOREIGN PATENT DOCUMENTS

CN      104143342 A      11/2014
CN      108346433         7/2018
(Continued)

OTHER PUBLICATIONS

De Leon, P. et al., "Detection of synthetic speech for the problem of imposture;" 2011 IEEE International Conference on Acoustics, Speech and Signal Processing; pp. 4844-4847; dated May 27, 2011.

(Continued)

*Primary Examiner* — Shreyans A Patel
(74) *Attorney, Agent, or Firm* — Gray Ice Higdon

(57) ABSTRACT

Processor(s) of a client device can: identify a textual segment stored locally at the client device; process the textual segment, using an on-device TTS generator model, to generate synthesized speech audio data that includes synthesized speech of the textual segment; process the synthesized speech, using an on-device ASR model to generate predicted ASR output; and generate a gradient based on comparing the predicted ASR output to ground truth output corresponding to the textual segment. Processor(s) of the client device can also: process the synthesized speech audio data using an on-device TTS generator model to make a prediction; and generate a gradient based on the prediction. In these implementations, the generated gradient(s) can be used to update weight(s) of the respective on-device model(s) and/or transmitted to a remote system for use in remote updating of respective global model(s). The updated weight(s) and/or the updated model(s) can be transmitted to client device(s).

18 Claims, 9 Drawing Sheets

Related U.S. Application Data

(60) Provisional application No. 63/090,553, filed on Oct. 12, 2020.

(51) Int. Cl.
    *G10L 13/047*     (2013.01)
    *G10L 13/10*     (2013.01)

(56) References Cited

U.S. PATENT DOCUMENTS

| | | | | |
|---|---|---|---|---|
| 2011/0010171 | A1* | 1/2011 | Talwar | G10L 17/02 |
| | | | | 704/275 |
| 2015/0161983 | A1 | 6/2015 | Yassa | |
| 2017/0287465 | A1* | 10/2017 | Zhao | G10L 13/08 |
| 2017/0352346 | A1* | 12/2017 | Paulik | G10L 15/07 |
| 2019/0005947 | A1 | 1/2019 | Kim et al. | |
| 2020/0357392 | A1* | 11/2020 | Zhou | G10L 15/1822 |
| 2021/0104223 | A1* | 4/2021 | Beaufays | G10L 13/047 |
| 2021/0183358 | A1* | 6/2021 | Mao | G10L 17/04 |
| 2021/0350786 | A1* | 11/2021 | Chen | G10L 13/00 |
| 2022/0115000 | A1* | 4/2022 | Beaufays | G10L 13/047 |

FOREIGN PATENT DOCUMENTS

| | | | | |
|---|---|---|---|---|
| CN | 108702580 | A * | 10/2018 | G10L 13/033 |
| CN | 108847221 | A * | 11/2018 | G10L 15/063 |
| CN | 110246488 | | 9/2019 | |
| CN | 110782870 | | 2/2020 | |
| CN | 111179973 | | 5/2020 | |
| CN | 111540345 | A * | 8/2020 | G10L 15/063 |
| JP | 7104247 | | 7/2022 | |
| JP | 7104247 | B2 * | 7/2022 | G10L 13/047 |
| KR | 20190118108 | | 10/2019 | |
| WO | 2020032919 | | 2/2020 | |
| WO | WO-2020032919 | A1 * | 2/2020 | G06F 21/31 |
| WO | 2020068056 | | 4/2020 | |
| WO | 2021006920 | | 1/2021 | |
| WO | WO-2021002967 | A1 * | 1/2021 | G06N 3/044 |
| WO | WO-2021006920 | A1 * | 1/2021 | G10L 13/047 |
| WO | 2021045793 | | 3/2021 | |
| WO | WO-2021045793 | A1 * | 3/2021 | G06F 3/04842 |
| WO | 2021162675 | | 8/2021 | |
| WO | WO-2021162675 | A1 * | 8/2021 | G10L 13/033 |

OTHER PUBLICATIONS

Anjum, Z.K. et al., "Spoofing and Countermeasures for Speaker Verification: A Review;" International Conference on Wireless Communications, Signal Processing and Networking (WISPNET); pp. 467-471; dated Mar. 22, 2017.

European Patent Office; International Search Report and Written Opinion issued in PCT Application No. PCT/US2021/053470; 14 pages; dated Feb. 4, 2022.

Jeno, S. et al., "Multi-Speaker Sequence-to-Sequence Speech Synthesis for Data Augmentation in Acoustic-to-Word Speech Recognition;" 2019 IEEE International Conference on Acoustics, Speech and Signal Processing; pp. 6161-6165; May 12, 2019.

Intellectual Property India; Examination Report issued in Application No. 202227062372; 8 pages; dated Dec. 27, 2023.

European Patent Office; Communication pursuant to Article 94(3) EPC issued in Application No. 21806067.1; 7 pages; dated May 22, 2024.

China National Intellectual Property Administration; Notification of First Office Action issued in Application No. 202180035307.3; 24 pages; dated Mar. 18, 2025.

Li, J. et al.; Adversarial Learning for Neural Dialogue Generation; 13 pages; dated Dec. 31, 2017.

Xing, Zhang; A Perspective Research of Artificial Intelligence for Handwritten Signature Verification; Journal of Information Security Research V.6, No. 7; 12 pages; dated Jul. 5, 2020.

Intellectual Property India; Hearing Notice issued in Application No. 202227062372; 4 pages; dated May 29, 2025.

European Patent Office; Communication pursuant to Article 94(3) EPC issued in Application No. 21806067.1; 6 pages; dated Aug. 1, 2025.

China National Intellectual Property Administration; Notice of Grant issued in Application No. 202180035307.3; 6 pages; dated Sep. 10, 2025.

* cited by examiner

ON-DEVICE PERSONALIZATION OF SPEECH SYNTHESIS FOR TRAINING OF SPEECH RECOGNITION MODEL(S)

BACKGROUND

Voice-based user interfaces are increasingly being used in the control of computers and other electronic devices. Voice-based user interfaces have continued to evolve from early rudimentary interfaces that could only understand simple and direct commands to more sophisticated interfaces that respond to natural language requests and that can understand context and manage back-and-forth dialogs or conversations with users. Many voice-based user interfaces perform speech recognition (e.g., using a speech-to-text (STT) model) on spoken utterances to generate corresponding text, perform a semantic analysis of the corresponding text in an attempt to determine the meaning of the spoken utterances, undertake one or more actions based on the determined meaning, track a flow of each of the conversations, and annotate the spoken utterances and/or the corresponding text with an indication of the user that provided the spoken utterances. Some voice-based user interfaces can also synthesize speech (e.g., using a text-to-speech model) based on text to generate corresponding synthesized speech audio data, and audibly render the synthesized speech audio data at a client device.

While performance of speech recognition has continued to improve, inaccurate speech recognition can still occur for many situations. As a non-limiting example, inaccurate speech recognition can occur for new terms and/or for terms that are relatively infrequent (or non-existent) in a training corpus on which a speech recognition model is trained. In an attempt to effectively recognize new terms and/or infrequent terms, techniques have been proposed to generate additional speech recognition hypotheses that are in addition to an initial hypothesis (or initial hypotheses), and consider the additional speech recognition hypotheses as candidates for speech recognition. However, such techniques require additional post-processing, and can still fail to lead to effective recognition of many terms in many situations, such as when the initial hypothesis/hypotheses are too far off-base and/or when a lexicon for the additional hypotheses does not include certain terms.

Moreover, inaccurate speech recognition can be exacerbated when speech recognition is performed on-device (i.e., on a client device). This can be due to, for example, an on-device speech recognition model being less robust than a cloud-based model, on-device memory and/or processor resources being more constrained than cloud-based resources, and/or additional hypotheses generation lexicons or language models being more constrained on device.

SUMMARY

Some implementations disclosed herein are directed to improving performance of speech recognition that is performed locally, at a client device, utilizing an on-device automatic speech recognition (ASR) model stored locally at the client device. In some of those implementations, processor(s) of the client device: train, based on a plurality of training instance, an on-device text-to-speech (TTS) generator model that is a portion of a generative adversarial network (GAN) model stored locally at the client device (e.g., in RAM and/or ROM of the client device). As described in detail herein, the on-device TTS generator model can be trained to include voice characteristic(s) of a user of the client device. Further, subsequent to training the on-device TTS generator model, processor(s) of the client device: identify a textual segment stored locally at the client device, process the textual segment using the trained on-device TTS generator model to generate synthesized speech audio data that includes synthesized speech corresponding to the textual segment; process the synthesized speech audio data using the on-device ASR model to generate predicted ASR output; and generate a gradient based on comparing the predicted ASR output to ground truth output corresponding to the textual segment. By utilizing the trained on-device TTS generator model in generating the synthesized speech audio data utilized in generating the gradient, the on-device ASR model can be updated using gradient(s) that are generated based on synthesized speech audio data that includes the voice characteristic(s) of the user of the client device and that are based on textual segments that are likely to be encountered at the client device, thereby improving performance of the on-device ASR model. For instance, by updating the ASR model in these and other manners, the on-device ASR model can be personalized to recognize these textual segments that are likely to be encountered at the client device, but otherwise are unlikely to be encountered at respective client devices of other users, and therefore are more difficult to recognize without such personalization of the on-device ASR model.

For example, the on-device ASR model can be an end-to-end speech recognition model that is used to generate predicted ASR output of a predicted textual segment, and generating the gradient can be based on comparing the predicted textual segment to a ground truth textual segment corresponding to the ground truth output. Also, for example, the on-device ASR model can instead be used to generate predicted ASR output of a sequence of predicted phonemes, and generating the gradient can be based on comparing the sequence of predicted phonemes to a ground truth sequence of phonemes corresponding to the ground truth output.

In some implementations, the generated gradient is used, by one or more processor(s) of the client device, to update one or more weights of the on-device ASR model based on the generated gradient. For example, backpropagation and/or other technique(s) can be used to update local weights of the on-device ASR model based on the gradient. This can improve speech recognition performance, at the client device using the on-device ASR model, for spoken utterances that include the textual segment. Moreover, this enables the on-device ASR model to be trained based on a particular textual segment, without requiring any actual human utterances of the particular textual segment (since the TTS generator model is used to generate synthesized speech of the particular textual segment). Thus, the particular textual segment can be correctly recognized using the on-device ASR model, despite the textual segment potentially not having been included in any spoken utterance previously detected at the client device. Further, many implementations repeat this process for a large quantity of textual segments stored locally at the client device, thereby improving on-device speech recognition performance for spoken utterances that include any of the textual segments. This effectively tailors the on-device ASR model to actual textual segments that are stored (transiently or non-transiently) on the device, and that are likely to be included in spoken utterances directed to the client device.

In some implementations, the on-device ASR model that is updated based on generated gradient(s) can be in addition to an on-device ASR model that is currently being utilized, by the client device, in performing speech recognition of spoken utterances detected at the client device. In those implementations, the on-device ASR model that is updated can, in response to one or more conditions being satisfied, be deployed to effectively replace the on-device ASR model that is currently being utilized (thereby becoming the on-device ASR model that is currently being utilized). For example, the condition(s) can include: on-device validation of the on-device ASR model that is updated; on-device determination that the on-device ASR model that is updated performs better (e.g., with respect to precision and/or recall) than the on-device ASR model currently being utilized; and/or occurrence of at least a threshold quantity and/or duration of training of the on-device ASR model that is updated. For example, determining that the on-device ASR model that is updated performs better than the on-device ASR model currently being utilized can be based on comparing performances based on training instance(s) that are generated according to techniques described herein, but that have not been utilized in training (i.e., instead held back for testing). As another example, determining that the on-device ASR model that is updated performs better than the on-device ASR model currently being utilized can be based on downloading test utterances at the client device (e.g., from the remote system), and processing the test utterances, using the updated on-device ASR model, to validate that the updated on-device ASR model has not diverged. Deploying a currently utilized on-device ASR model to effectively replace an updated on-device ASR model can include updating weights of the currently utilized on-device ASR model with weights of the updated on-device ASR model, or replacing the currently utilized on-device ASR model with the updated on-device ASR model. Once an updated on-device ASR model effectively replaces a currently utilized on-device ASR model and is used for speech recognition, a copy of the updated on-device ASR model can then be used as the new on-device ASR model to be updated.

In some implementations, the generated gradient is additionally or alternatively transmitted, by the client device and over a network, to a remote system. In those implementations, the remote system utilizes the generated gradient, and additional gradients from additional client devices and/or from the remote system, to update global weights of a global ASR model. The additional gradients from the additional client devices can be similarly generated, locally at the corresponding additional client devices, based on corresponding locally stored textual segments and locally generated synthesized speech thereof. In various implementations, the client device transmits the generated gradient without transmitting any of: the textual segment, the synthesized speech audio data, the predicted ASR output, and the ground truth output corresponding to the textual segment. The remote system can utilize the generated gradient in updating the global ASR model, without any reference to or use of the textual segment, the synthesized speech audio data, the predicted ASR output, and the ground truth corresponding to the textual segment. The transmitting of only the gradient can, in some instances, utilize less network resources than transmitting of the larger data size combination of the textual segment, the synthesized speech audio data, the predicted ASR output, and the ground truth output corresponding to the textual segment. Further, transmitting of the gradient preserves privacy and security of the on-device textual segment, as the textual segments and the synthesized speech audio data are not derivable from the gradient. In some implementations, one or more differential privacy techniques (e.g., adding gaussian noise) can be utilized to further ensure the textual segments and/or the synthesized speech audio data are not derivable from the gradient.

In implementations where the remote system updates the global weights of the global ASR model, the remote system can thereafter provide the updated global weights to client devices to cause the client devices to replace the local weights of their on-device ASR models with the updated global weights of the global ASR model. In some implementations, the remote system can additionally or alternatively provide the updated global ASR model to client devices to cause the client devices to replace their on-device ASR models with the updated global ASR model. On-device speech recognition performance is therefore improved through utilization of the updated global weights or the updated global ASR model.

Some additional or alternative implementations disclosed herein are directed to improving performance of speech synthesis that is performed locally, at a client device, utilizing an on-device text-to-speech (TTS) generator model stored locally at the client device. In those implementations, processor(s) of the client device: identify a textual segment stored locally at the client device; process the textual segment using a trained on-device TTS generator model stored locally at the client device to generate synthesized speech audio data that includes synthesized speech corresponding to the textual segment; and process the synthesized speech audio data using a trained on-device TTS discriminator model stored locally at the client device to generate discriminator output; and generate a gradient based on the discriminator output (e.g., by comparing it to a ground truth output). The discriminator output indicates a prediction as to whether the synthesized speech corresponds to (i) the synthesized speech audio data generated by the on-device TTS generator model or instead to (ii) an actual spoken utterance of a user of the client device. For example, the on-device TTS generator model and the on-device TTS discriminator model can be portions of a GAN model. The on-device TTS generator model tries to make the on-device TTS discriminator model predict that the synthesized speech audio data is actually a spoken utterance of the user of the client device. As a result, the prediction made by the on-device TTS discriminator model can be compared to a ground truth label that indicates the synthesized speech audio data was actually generated by the on-device TTS generator model.

In some implementations, the generated gradient is used, by one or more processor(s) of the client device, to update one or more weights of the on-device TTS generator model based on the generated gradient. For example, backpropagation and/or other technique(s) can be used to update local weights of the on-device TTS generator model based on the gradient. This can improve speech synthesis performance, at the client device using the on-device TTS generator model, for spoken utterances that include the textual segment. Moreover, this enables the on-device TTS generator model to be trained based on a particular textual segment, without requiring any actual human utterances of the particular textual segment. Thus, the particular textual segment can be correctly synthesized using the on-device TTS generator model, despite the textual segment potentially not having been included in any synthesized speech previously generated at the client device. Further, many implementations repeat this process for a large quantity of textual segments stored locally at the client device, thereby improving on-device speech synthesis performance for spoken utterances that include any of the textual segments. This effectively tailors the on-device TTS generator model to actual textual segments that are stored (transiently or non-transiently) on the device, and that are likely to be included in synthesized speech generated at the client device.

In some implementations, the on-device TTS generator model that is updated based on generated gradient(s) can be in addition to an on-device TTS generator model that is currently being utilized, by the client device, in performing speech synthesis at the client device. In those implementations, the on-device TTS generator model that is updated can, in response to one or more conditions being satisfied, be deployed to effectively replace the on-device TTS generator model that is currently being utilized (thereby becoming the on-device TTS generator model that is currently being utilized). These conditions can be the same or similar as those described above with respect to updating the on-device ASR model. Deploying a currently utilized on-device TTS generator model to effectively replace an updated on-device TTS generator model can include updating weights of the currently utilized on-device TTS generator model with weights of the updated on-device TTS generator model, or replacing the currently utilized on-device TTS generator model with the updated on-device TTS generator model. Once an updated on-device TTS generator model effectively replaces a currently utilized on-device TTS generator model and is used for speech synthesis, a copy of the updated on-device TTS generator model can then be used as the new on-device TTS generator model to be updated.

In some implementations, the generated gradient is additionally or alternatively transmitted, by the client device and over a network, to a remote system. In those implementations, the remote system utilizes the generated gradient, and additional gradients from additional client devices, to update global weights of a global TTS generator model. The additional gradients from the additional client devices can be similarly generated, locally at the corresponding additional client devices, based on corresponding locally stored textual segments and locally generated synthesized speech thereof. In various implementations, the client device transmits the generated gradient without transmitting any of: the textual segment, the synthesized speech audio data, and the prediction made at the client device. The remote system can utilize the generated gradient in updating the global TTS generator model, without any reference to or use of the textual segment, the synthesized speech audio data, and the prediction made at the client device. The transmitting of only the gradient utilizes less network resources than transmitting of the larger data size combination of the textual segment, the synthesized speech audio data, and the prediction made at the client device. Further, transmitting of the gradient preserves privacy and security of the on-device textual segment, as the textual segments and the synthesized speech audio data are not derivable from the gradient. In some implementations, one or more differential privacy techniques (e.g., adding gaussian noise) can be utilized to further ensure the textual segments and/or the synthesized speech audio data are not derivable from the gradient.

In implementations where the remote system updates the global weights of the global TTS generator model, the remote system can thereafter provide the updated global weights to client devices to cause the client devices to replace the local weights of their on-device TTS generator models with the updated global weights of the global TTS generator model. In some implementations, the remote system can additionally or alternatively provide the updated global TTS generator model to client devices to cause the client devices to replace their on-device TTS generator models with the updated global TTS generator model. On-device speech synthesis performance is therefore improved through utilization of the updated global weights or the updated global TTS generator model.

Various techniques can be utilized by a client device to identify locally stored textual segment(s) for utilization in generating gradients based on the textual segment(s) and corresponding locally generated synthesized speech. For example, the textual segment(s) can be identified based on them being included in a contacts list, a media playlist, a list of aliases of linked smart devices (e.g., aliases of smart lights, smart plugs, and/or other smart devices linked with an account of the client device), from typed input received at the client device, and/or from spoken utterances received at the client device. As another example, the textual segment(s) can additionally or alternatively be identified based on determining that the textual segment(s) are out of vocabulary (i.e., textual segment(s) on which the on-device ASR model has not been previously trained). As yet another example, a textual segment can be identified based on determining that a prior human utterance, detected via microphone(s) of the client device, included the textual segment and determining that a prior speech recognition of the prior human utterance, performed using the on-device ASR model, failed to correctly recognize the textual segment. Determining that the prior speech recognition failed to correctly recognize the textual segment can be based on received user input that cancels an incorrect prediction that is based on the prior speech recognition. Further, determining that the prior human utterance included the textual segment can be based on the received user input and/or based on additional received user input that is received after the user input that cancels the incorrect prediction based on the prior speech recognition.

To conserve limited battery, processor, memory, and/or other resources of a client device, in various implementations a client device performs one or more steps disclosed herein only responsive to determining a current state of the client device satisfies one or more conditions. For example, generating the synthesized speech audio data, and/or processing the synthesized speech audio data to generate the predicted ASR output, and/or generating the gradient, and/or updating the one or more weights can be performed responsive to determining that the current state of the client device satisfies the one or more conditions. Whether the one or more conditions are satisfied can be determined based on sensor data from one or more sensors of the client device. The one or more conditions can include, for example, that the client device is charging, that the client device has at least a threshold state of charge, that a temperature of the client device (based on one or more on-device temperature sensors) is less than a threshold, that the client device is not being held by a user, and/or that the client device is connected to an unmetered network (e.g., WiFi).

In various implementations, the on-device TTS generator model and the on-device TTS discriminator model portions of the GAN model may be trained prior to generating the gradient(s). In some versions of those implementations, the on-device TTS discriminator model can be trained based on a plurality of discriminator training instances. Each of the discriminator training instances can include training instance input and training instance output. The training instance input can include audio data that includes a spoken utterance of the user of the client device or synthesized speech audio data generated using the on-device TTS generator model (or another TTS generator model), and the training instance output can include a ground truth label that indicates whether the corresponding training instance input corresponds to the audio data that includes the spoken utterance of the user of the client device (e.g., a semantic label of "real" or "human", or a ground truth probability corresponding thereto, such as "0" or "1") or the synthesized speech audio data generated using the on-device TTS generator model (or another TTS generator model) (e.g., a semantic label of "fake" or "synthesized", or a ground truth probability corresponding thereto, such as "0" or "1"). The training instances that include the audio data that includes the spoken utterance of the user of the client device may be considered positive discriminator training instances, and the training instances that include the synthesized speech audio data generated using the on-device TTS generator model (or another TTS generator model) can be considered negative discriminator training instances. Further, the on-device TTS discriminator model, in processing, the training instance input, of a given discriminator training instance, predicts whether the training instance input corresponds to human speech or synthesized speech. The prediction can include, for example, a semantic label (e.g., "real", "human", "fake", "synthesized", etc.), a binary value (e.g., "0" for "synthesized" or "fake", and "1" for "real" or "human"), and/or a probability (e.g., "0.6" for "synthesized" or "fake", and "0.4" for "real" or "human"). Moreover, the prediction can be compared to the ground to the ground truth output to generate a loss, and the on-device TTS discriminator model can be updated based on the loss (e.g., backpropagated across the on-device TTS discriminator model to update weights thereof). This can be repeated for a plurality of additional discriminator training instances to train the on-device TTS discriminator model.

In some versions of those implementations, the on-device TTS generator model can be trained based on a plurality of generator training instances. Each of the generator training instances can include training instance input and training instance output. The training instance input can include textual segment(s) (e.g., identified in any manner described herein), and the training instance output can include a ground truth label that indicates any resulting audio data processed by the on-device TTS discriminator model corresponds to synthesized speech audio data generated using the on-device TTS generator model (e.g., a semantic label of "fake" or "synthesized", or a ground truth probability corresponding thereto, such as "0" or "1"). Further, the on-device TTS generator model, in processing the training instance input, of a given generator training instance, generates synthesized speech audio data that includes synthesized speech, and the on-device TTS discriminator model, in processing the synthesized speech audio data, predicts whether the training instance input corresponds to human speech or synthesized speech. The prediction can include, for example, a semantic label (e.g., "real", "human", "fake", "synthesized", etc.), a binary value (e.g., "0" for "synthesized" or "fake", and "1" for "real" or "human"), and/or a probability (e.g., "0.6"). Moreover, the prediction can be compared to the ground truth output to generate a loss, and the on-device TTS generator model can be updated based on the loss (e.g., the loss may be backpropagated across the on-device TTS generator model to update weights thereof). This can be repeated for a plurality of additional generator training instances to train the on-device TTS generator model. The loss utilized in updating the on-device TTS generator model may be considered an adversarial loss. Notably, in generating the synthesized speech audio data, the on-device TTS generator model tries to trick the on-device TTS discriminator model into predicting that the synthesized speech audio data corresponds to human speech of the user of the client device. Thus, by updating the on-device TTS generator model based on the adversarial loss, the on-device TTS generator model can learn voice characteristics that reflect those of the user of the computing device since the on-device TTS discriminator model was trained to discriminator between human speech of the user of the client device and synthesized speech generated by the on-device TTS generator model (or another TTS generator model).

In some additional or alternative versions of those implementations, the training instance output, for one or more of the generator training instances, can additionally or alternatively include ground truth audio data corresponding to the textual segment(s) of the corresponding training instance input. In some further versions of those implementations, acoustic features of the predicted synthesized speech audio data generated using the on-device TTS generator model can be compared to acoustic features of the ground truth audio data, and an additional loss can be generated based on comparing the acoustic features. The acoustic features can include, for example, audio waveforms, mel-frequency cepstral coefficients (MFCCs), mel-filterbank features, values associated with one or more prosodic properties, neural representations of the audio data (e.g., respective embeddings of the ground truth audio data and the predicted synthesized speech audio data), and/or other acoustic features of the synthesized speech audio data and the ground truth audio data that can be compared. The on-device TTS generator model can additionally or alternatively be updated based on the additional loss (e.g., the additional loss may be backpropagated across the on-device TTS generator model to update weights thereof).

As described herein, after updating of an on-device ASR model and/or an on-device TTS generator model according to implementations disclosed herein, the on-device ASR model can be utilized in processing audio data corresponding to spoken utterances, from user(s) of the corresponding device, to generate corresponding predicted ASR output, and/or the on-device TTS model can be utilized in processing textual segments, from client device(s) of the user(s), to generate corresponding synthesized speech audio data that includes synthesized speech. In implementations where the on-device ASR model is utilized, a gradient can be generated, on-device, based on comparing an instance of a predicted ASR output to an instance of a ground truth output. The instance of the ground truth textual segment can be determined, on-device, based on one or more action(s) and/or inaction(s) of the user responsive to content rendered at the device based on the instance of the predicted ASR output and/or based on action(s) taken at the device based on the instance of the predicted ASR output. For example, if the user confirms a predicted textual segment, the predicted textual segment can be considered a ground truth textual segment. For instance, if the spoken utterance is "call Francis", and the predicted textual segment is "call Francis", the user can confirm the predicted textual segment by not canceling a resulting dialing of a phone number for a contact named "Francis". Also, for instance, if the spoken utterance is "call Francis", the predicted textual segment is "call Francis", a prompt of "do you want to call Francis" can be provided with a selectable "yes" option, and the user can confirm the recognized text by selecting the "yes" option. As another example, if the user modifies the predicted textual segment (e.g., by adding and/or deleting character(s); and/or by deleting it and replacing it with alternate text), the modified text can be considered the ground truth textual segment. For instance, if the spoken utterance of "Hi Françoise, please call me soon" is provided for inclusion in a text message, and the incorrectly recognized text of "Hi Francis, please call me soon" is incorporated into the text message, the user can select "Francis" and replace it with "Françoise". Responsive to the user selecting "Francis" and replacing it with "Françoise", the modified text of "Hi Françoise, please call me soon" can be utilized as the ground truth textual segment. Also, for instance, if the spoken utterance of "Hi Françoise, please call me soon" is provided for inclusion in a text message, a first selectable graphical element of "Francis" and a second selectable graphical element of "Françoise" can be presented to the user that provided the spoken utterance. Responsive receiving a selection of the second graphical element of "Françoise" from the user, the text of "Hi Françoise, please call me soon" can be utilized as the ground truth textual segment.

In implementations where the on-device TTS generator model is utilized, a gradient can be generated, on-device, based on processing, using the on-device TTS discriminator model, predicted synthesized speech audio data to predict whether synthesized speech (included in the synthesized speech audio data) is actual spoken utterance(s) of the user(s) of the client device(s) or the synthesized speech generated by on-device TTS generator model. The predicted synthesized speech audio data can be generated based on textual segment(s) identified as described herein. The prediction made by processing the synthesized speech audio data using the on-device TTS discriminator model can be compared to a ground truth label that indicates the synthesized speech audio data. For instance, if the on-device TTS discriminator model incorrectly predicts that the synthesized speech corresponds to actual spoken utterance(s) of the user(s) of the client device(s), then a first gradient can be generated. However, if the on-device TTS discriminator model correctly predicts that the synthesized speech corresponds to synthesized speech generated by the on-device TTS generator model, then a second gradient can be generated.

Gradient(s) generated based on these techniques can be transmitted, by the client device and over a network, to a remote system. In those implementations, the remote system utilizes the generated gradient(s), and additional gradients generated from additional client devices in a similar manner (e.g., after local updating of on-device model(s), such as an on-device ASR model or an on-device TTS generator model), to update global weights of a global model(s) (e.g., a global ASR model or a global TTS generator model). It is noted that the updating of the global weights based on such gradients can occur along with, or independent of, updating of the global weights based on gradients that are based on locally stored textual segments and locally generated synthesized speech thereof. It is also noted that transmitting such gradients can occur without transmitting any of: audio data, synthesized speech audio data, textual segment(s), predicted ASR output(s), and/or prediction(s). The remote system can utilize the generated gradient in updating the global model(s), without any reference to or use of the audio data, synthesized speech audio data, textual segment(s), predicted ASR output(s), and/or prediction(s). The transmitting of only the gradient utilizes less network resources, and preserves privacy and security of data stored and/or generated locally at the client device. In some implementations, one or more differential privacy techniques can be utilized to further ensure preservation of the privacy and security of data stored and/or generated locally at the client device.

In some implementations, after updating of an on-device ASR model and/or an on-device TTS generator model according to implementations disclosed herein, biasing of the on-device speech recognition and/or on-device speech synthesis based on textual segment(s) can also be utilized, when the on-device ASR model is processing audio data corresponding to spoken utterances to generate corresponding predicted textual segments and/or when the on-device TTS generator model is processing textual segment(s) to generate corresponding predicted synthesized speech audio data. For example, the on-device speech recognition can be biased toward one or more textual segments stored on the device, such as contact alias(es), road name(s), media name (s), and/or other textual segment(s). The textual segment(s) to which on-device speech recognition is biased can be the same across multiple iterations of speech recognition and/or can vary amongst iterations. For example, biasing toward a first textual segments can occur in first device context(s) (e.g., context(s) based on which application(s) are executing or in the foreground, based on time of day, based on day of week, etc.) and biasing toward disparate second textual segments can occur in second device context(s). Biasing the on-device speech recognition to textual segment(s) can include, for example, injecting the textual segment(s) into the speech recognition by boosting the probability of the textual segment(s) during decoding. Biasing the on-device speech recognition based on textual segment(s) after updating of the on-device speech recognition model according to implementations disclosed herein can be more effective than biasing without such updating. This can be due to, for example, the on-device speech recognition model having been trained on sound sequences from the textual segment(s) as a result of having been updated based on synthesized speech that is based on the textual segment(s). As another example, the on-device speech synthesis can be biased towards voice characteristic(s) of the user of the client device. The voice characteristic(s) of the user of the client device can include, for example, prosodic properties include prosodic properties (e.g., one or more of intonation, tone, stress, rhythm, tempo, or pause) that are indicative of speech of the user of the client device. Notably, although the synthesized speech includes voice characteristic(s) of the user, the synthesized speech need not be an exact match of speech of the user of the client device.

In various implementations, global model(s) described herein may be particular to a specific geographic language and/or a specific language. For example, the gradient(s) generated at a client device that is primarily located in a particular geographic region may only be utilized to update global model(s) associated with the particular geographic region. For instance, the gradient(s) generated at a client device that is primarily located in Chicago, Illinois may only be utilized to the global model(s) associated with a Midwest geographic region, or a United States geographic region. As another example, the gradient(s) generated at a client device that primarily utilizes the Spanish language may only be utilized to update global model(s) associated with the Spanish language. In this manner, the global model(s) may be one of N available model(s) for a given language and/or a particular geographic region.

Some implementations of client devices disclosed herein include an automated assistant application that generates the on-device speech recognitions (or that utilizes generated on-device speech recognitions) and/or that generates the on-device synthesized speech (or that utilizes generated on-device synthesized speech). The automated assistant application can be installed "on-top of" an operating system of the client device and/or can itself form part of (or the entirety of) the operating system of the client device. The automated assistant application includes, and/or has access to, the on-device speech recognition and the on-device speech synthesis as well as optionally on-device natural language understanding and/or on-device fulfillment. On-device natural language understanding (NLU) can be performed using an on-device NLU module that processes recognized text, generated using the on-device speech recognition, and optionally contextual data, to generate NLU data. NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, remote fulfillment, and/or remote speech synthesis can at least selectively be utilized. For example, recognized text can at least selectively be transmitted to remote automated assistant component(s) for remote NLU, remote fulfillment, and/or remote speech synthesis. For instance, the recognized text can optionally be transmitted for remote performance in parallel with on-device performance, or responsive to failure of on-device NLU and/or on-device fulfillment. However, on-device speech processing, on-device NLU, on-device fulfillment, on-device speech synthesis, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

The above description is provided as an overview of some implementations of the present disclosure. Further description of those implementations, and other implementations, are described in more detail below.

Some implementations disclosed herein include one or more computing devices that include one or more processors such as central processing unit(s) (CPU(s)), graphics processing unit(s) (GPU(s)), digital signal processor(s) (DSP(s)), and/or tensor processing unit(s) (TPU(s)). One or more of the processors are operable to execute instructions stored in associated memory, and the instructions are configured to cause performance of any of the methods described herein. The computing devices can include, for example, client assistant devices with microphone(s), at least one display, and/or other sensor component(s). Some implementations also include one or more non-transitory computer readable storage media storing computer instructions executable by one or more processors to perform any of the methods described herein.

DETAILED DESCRIPTION

Figure 1A:
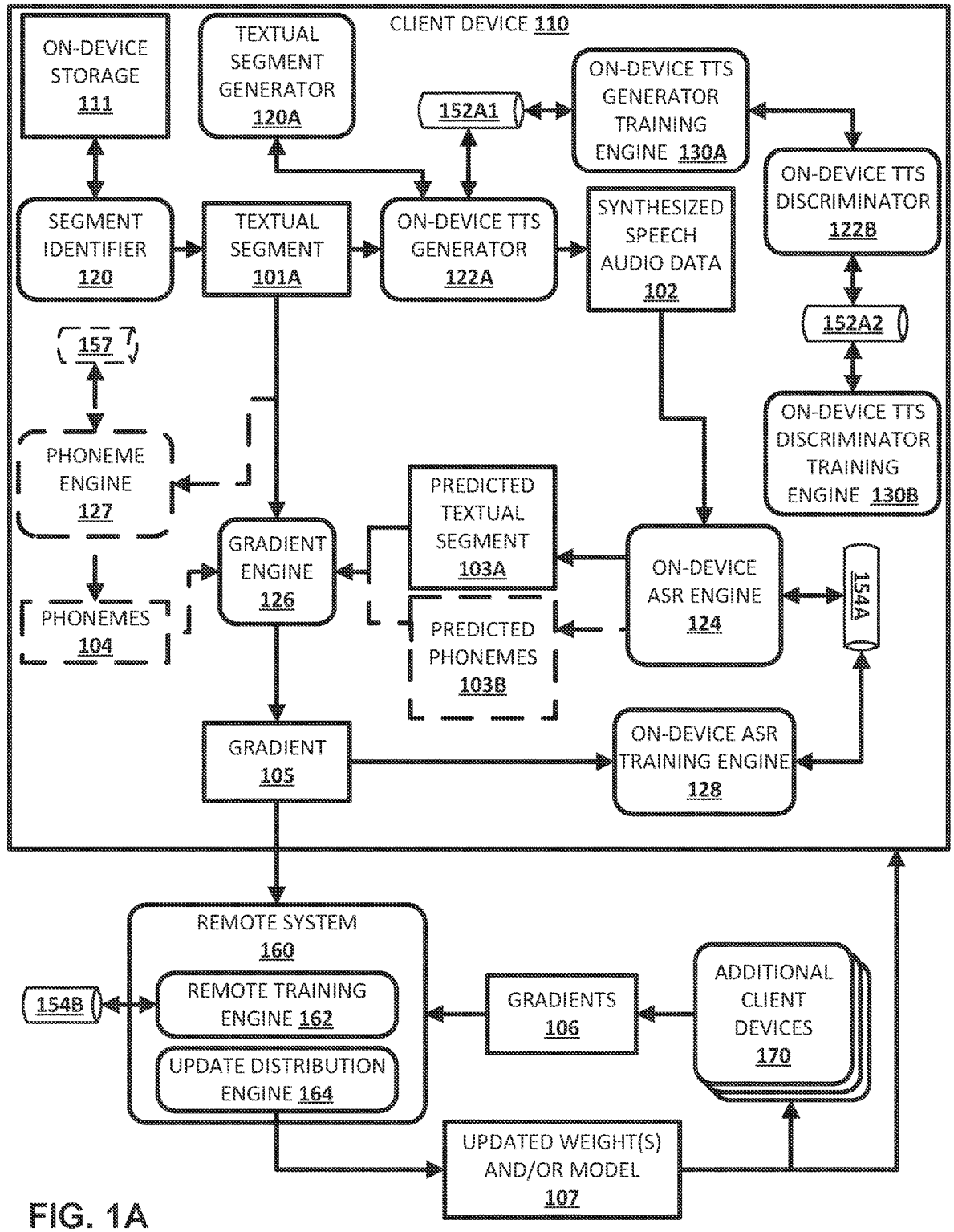
FIG. 1A depicts an example process flow for updating an on-device ASR model based on a gradient generated locally at a client device and/or transmitting the gradient to a remote system for updating a global ASR model, in accordance with various implementations.

Turning now to FIG. 1A, an example process flow for updating an on-device ASR model based on a gradient generated locally at a client device and/or transmitting the gradient to a remote system for updating a global ASR model is depicted. A client device 110 is illustrated in FIG. 1A, and includes the components that are encompassed within the box of FIG. 1A that represents client device 110. A segment identifier 120 of the client device 110 accesses on-device storage 111 to identify a textual segment 101A. The on-device storage 110 can include, for example, read-only memory (ROM) and/or random-access memory (RAM). The textual segment 101A identified by the segment identifier 120 is a textual segment that is transiently or non-transiently stored in on-device storage 111. For example, the textual segment 101 can be: an alias of a contact that is stored in a contacts list; a name of a road that is stored as an address in a contacts list; a name of a song or other media item that is included in a playlist of a media application; an alias of a smart device, where the alias is stored at the client device and the smart device is associated with an account of the user; a textual segment typed via a virtual keyboard at the client device; a textual segment copied to a pasteboard at the client device; a textual segment rendered by an application of the computing device (and optionally identified using a screenshot and image recognition); a textual segment generated based on processing spoken utterances of a user of the client device 110; or other textual segment. The on-device storage 111 can include any textual segments corresponding to speech of the user of the client device 110 (e.g., determined using speaker identification or speaker diarization techniques), or any other user of the client device 110 in instances where the client device 110 is associated with multiple users (e.g., a shared client device located in a primary dwelling of a family).

In some implementations, the segment identifier 120 identifies the textual segment 101 based on it being newly encountered or newly stored at the client device 110. For example, the segment identifier 120 can identify the textual segment 101A based on it being included in a newly added contact, being an alias for a newly added smart device, being an alias for a newly added song to a playlist, or being generated based on processing a spoken utterance of the user of the client device 110. In some implementations, the segment identifier 120 identifies the textual segment 101A based on determining that the textual segment 101 is out of vocabulary, which can be based on determining that the textual segment 101A is not included in a locally stored lexicon. Notably, any textual segments identified by the segment identifier 120 may, in many implementations, be restricted to those derived from spoken utterances of the user (or user(s)) of the client device 110.

In some implementations, the segment identifier 120 can identify the textual segment 101A based on determining that a spoken utterance, detected via microphone(s) of the client device 110, included the textual segment 101A and determining that a prior speech recognition of the prior spoken utterance failed to correctly recognize the textual segment 101A. In those implementations, the segment identifier 120 can determine that the prior speech recognition failed to correctly recognize the textual segment based on received user input, at the client device 110, that cancels an incorrect prediction that is based on the prior speech recognition. Further, the segment identifier 120 can determine that the prior human utterance included the textual segment 101A based on additional received user input, that is received after the user input that cancels the incorrect prediction based on the prior speech recognition.

The segment identifier 120 provides at least the textual segment 101A to an on-device TTS generator 122A. In some implementations, the segment identifier 120 provides the identified textual segment, as well as additional textual segment(s), to the on-device TTS generator 122A. For example, the segment identifier 120 can append the additional textual segment(s) before and/or after the textual segment, and provide the textual segment 101A with appended additional textual segment(s) to the on-device TTS generator 122A. In some of those implementations, textual segment generator 120A can process the textual segment 101A to generate a plurality of contextually relevant and semantically diverse additional textual segments. For example, the textual segment generator 120A can determine that the additional textual segment(s) are semantically diverse based on generating, over an encoder model, a plurality of candidate textual segment embeddings. The generated candidate textual segment embeddings can be a lower-dimensional representation mapping the candidate textual segment(s) to a lower-dimensional candidate textual segment embedding space. The embedding for a given one of the candidate textual segment(s) may be compared to embedding(s) of candidate textual segment(s), and the candidate textual segment(s) can be pre-pended or appended to the textual segment 101A if the comparing indicates difference metric(s) is satisfied. For example, the difference metric(s) may be satisfaction of a threshold that indicates a sufficient degree of semantic difference between the given textual segment and an already selected candidate textual segment. As another example, the textual segment generator 120A can determine that textual segment(s) are contextually relevant based on defined relationship(s) of an additional textual segment to a particular corpus from which the textual segment 101A was identified. For example, if textual segment 101A is identified from a media corpus, additional textual segments of "play" and "show me" can have a defined relationship to the media corpus, and one of those additional textual segments appended before the textual segment. As another example, if the textual segment 101A is identified from a prior spoken utterance of "Send Francoise a message", but speech recognition failed to correctly recognize "Francoisé", additional textual segments of "Schedule a meeting with Francoisé" and "Remind me to tell Francoise about the presentation" can be generated. Generating a plurality of semantically diverse and contextually relevant additional textual segment(s) that are pre-pended or appended to the textual segment 101A allows multiple diverse training instances to be generated based on the textual segment 101A.

The on-device TTS generator 122A processes the textual segment 101A (and any pre-pended or appended additional textual segment(s)), using an on-device TTS generator model 152A1, to generate synthesized speech audio data 102 that includes synthesized speech of the identified textual segment 101A. For example, the on-device TTS generator 122A can determine a sequence of phonemes determined to correspond to the textual segment 101A (and any pre-pended or appended additional textual segment(s)) and process the sequence of phonemes using the on-device TTS generator model 152A1, to generate synthesized speech audio data 102. The synthesized speech audio data 102 can be, for example, in the form of an audio waveform. In determining a sequence of phonemes that correspond to the textual segment 101, the on-device TTS generator 122A can access a tokens-to-phonemes mapping stored locally at the client device 110, such as optional token-to-phonemes mapping 157. In some implementations, the synthesized speech audio data 102 that is generated can be a mix of human speech and synthesized speech. For example, if the textual segment 101A is identified from a prior spoken utterance of "Send Francoisé a message", but speech recognition failed to correctly recognize "Francoisé", additional textual segments of "Schedule a meeting with Francoisé" and "Remind me to tell Francoisé about the presentation" can be generated. In these examples, the portion of the synthesized speech audio data 102 for the additional textual segments may include audio data that captures speech of the user for "Francoisé", but the remaining portions of the synthesized speech audio data 102 may correspond to synthesized speech. For instance, assume that the synthesized speech audio data 102 corresponds to "Schedule a meeting with Francoisé". In this example, the portion that corresponds to "Schedule a meeting with" can be synthesized speech audio data generated using the on-device TTS generator 122A, and the portion that corresponds to "Francoisé" can be audio data from the original spoken utterance.

In some implementations, the on-device TTS generator model 152A is transmitted (e.g., by the remote system 160 or other component) for storage and use at the client device 110, based on a geographic region of the user of the client device 110, a primary language of the user of the client device 110, and/or other properties of the client device 100 and/or a user of the client device 110. For example, the on-device TTS generator model 152A1 can be one of N available TTS generator models for a given language, but can be trained based on spoken utterances that are specific to a particular geographic region and provided to client device 110 based on the client device 110 being primarily located in the particular geographic region.

The on-device TTS generator model 152A1 is trained by the on-device TTS generator training engine 130A to adapt the on-device speech synthesis model 152 to voice characteristic(s) of user(s) of the client device 110 based on a plurality of training instances. Each training instance, of the plurality of training instances, includes training instance input and training instance output.

In some implementations, the on-device TTS generator training engine 130A can identify a ground truth transcription for a prior spoken utterance of the user of the client device 110 by generating a transcription (e.g., by processing the corresponding audio data using the on-device ASR model 154A), and identifies the transcription as the ground truth transcription. The ground truth transcription can also include one or more ground truth textual segments for corresponding terms included in the prior spoken utterance of the user of the client device 110. Identifying the transcription as "ground truth" can optionally be contingent on a confidence measure for the transcription satisfying a threshold and/or based on user action(s) (or inactions), responsive to generating the transcription, indicating the transcription is correct. In those implementations, the transcription (or a textual segment included in the transcription) can be utilized as training instance input for a given training instance, and the corresponding audio data that captures the prior spoken utterance can be utilized as training instance output for the given training instance. In some versions of those implementations, the prior spoken utterance can be an enrollment phrase spoken by the user for text-independent or text-dependent identification, and the enrollment phrase can be rendered to the user to inform the user what to speak during the enrollment. In those implementations, the enrollment phrase rendered to the user can be utilized as the ground truth transcription (or a ground truth textual segment included in the transcription).

For example, prior to generating the synthesized speech audio data 102, the on-device TTS generator training engine 130A can identify audio data that is detected via one or more microphones of the client device 110 and that captures a prior human utterance. Further, the on-device TTS generator training engine 130A can identify a ground truth transcription for the prior human utterance. Yet further, the on-device TTS generator training engine 130A can cause the on-device TTS generator 122A to process the ground truth transcription using the on-device TTS generator model 152A1 to generate prior synthesized speech audio data, and can generate a loss based on comparing the prior synthesized speech audio data to the prior audio data. The on-device speech TTS generator engine 130A can then update weight(s) of the on-device TTS generator model 152A1 based on the loss (e.g., using backpropagation and/or other training technique(s)).

In some additional or alternative implementations, the on-device TTS generator model 152A1 may be a generator portion of a generative adversarial network (GAN) model. The GAN model may also include an on-device TTS discriminator model 152A2 stored locally at the client device 110. In some versions of those implementations, on-device TTS discriminator training engine 130B can identify a plurality of training instances utilized in training the on-device TTS discriminator model 152A2 (e.g., discriminator training instances). The on-device TTS discriminator training engine 130B can identify a plurality of positive training instances and a plurality of negative training instances. The training instance input, for each of the plurality of positive training instances, can include audio data that captures a prior spoken utterance of the user of the client device 110. The training instance output, for each of the plurality of positive training instances, can include a ground truth label (e.g., a binary value, a semantic label, a probability, etc.) that indicates the training instance input corresponds to speech of the user of the client device 110. In contrast, the training instance input, for each of the plurality of negative training instances, can include synthesized audio data that captures synthesized speech generated using the on-device TTS generator model 152A1 (or another speech synthesizer stored locally at the client device or remotely at a remote system). The training instance output, for each of the plurality of negative training instances, can include a ground truth label (e.g., another binary value, another semantic label, a probability, etc.) that indicates the training instance input corresponds to synthesized speech.

For example, prior to generating the synthesized speech audio data 102, the on-device TTS discriminator training engine 130B can identify audio data that is detected via microphone(s) of the client device 110 and that captures a prior spoken utterance of the user of the client device 110. Further, the on-device TTS discriminator training engine 130B can identify synthesized speech audio data that captures synthesized speech generated using the on-device TTS generator model 152A1 (or another speech synthesizer stored locally at the client device or remotely at a remote system). Yet further, the on-device TTS discriminator training engine 130B can identify corresponding ground truth labels for the spoken utterance and the synthesized speech. Moreover, the on-device TTS discriminator training engine 130B can cause the on-device TTS discriminator 122B to process the audio data (or synthesized speech audio data) using the on-device TTS discriminator model 152A2 to predict whether the audio data (or synthesized speech audio data) corresponds to a spoken utterance (or portion thereof) of the user of the client device 110 or synthesized speech generated using the on-device TTS generator model 152A1 (or another speech synthesizer stored locally at the client device or remotely at a remote system), and can generate a loss based on the prediction. The on-device TTS discriminator training engine 130B can then update weight(s) of the on-device TTS discriminator model 152A2 based on the loss (e.g., using backpropagation and/or other training technique(s)).

Further, the on-device TTS generator training engine 130A can identify a plurality of training instances utilized in training in the on-device TTS generator model 152A1 (e.g., generator training instances). The training instances can include a given textual segment stored locally at the client device 110 (and any pre-pended or appended additional textual segment(s)). For example, prior to generating the synthesized speech audio data 102 (and optionally subsequent to training the on-device TTS discriminator model 152A2), the on-device TTS generator training engine 130A can identify a given textual segment stored locally on the client device 110. The on-device TTS generator training engine 130A can cause the on-device TTS generator engine 122A to process the given textual segment (and any pre-pended or appended additional textual segment(s)) using the on-device TTS generator model 152A1 to generate synthesized speech audio data that includes synthesized speech. Further, the on-device TTS discriminator training engine 130B can cause the on-device TTS discriminator 122B to process the synthesized speech audio data using the on-device TTS discriminator model 152A2 to predict whether the synthesized speech audio data corresponds to a spoken utterance (or portion thereof) of the user of the client device 110 or synthesized speech generated using the on-device TTS generator model 152A1, and can generate a loss based on the prediction. The on-device TTS generator training engine 130A can then update weight(s) of the on-device TTS generator model 152A1 based on the loss(e.g., using backpropagation and/or other training technique(s)). This loss may be considered an adversarial loss utilized in training the on-device TTS generator model 152A1 of the GAN model. In other words, in training the on-device TTS generator model 152A1, the on-device TTS generator model 152A1 tries to trick the on-device TTS generator model 152B1 into predicting the synthesized speech audio data corresponds to audio data that captures a spoken utterance of the user of the client device 110 rather than synthesized speech generated using the on-device TTS generator model 152A1.

The trained on-device TTS generator 122A provides the synthesized speech audio data 102 to the on-device ASR engine 124. The on-device ASR engine 124 processes the synthesized speech audio data 102, using an on-device ASR model 154A, to generate predicted ASR output (e.g., a predicted textual segment 103A, a predicted sequence of phonemes 103B, and/or other predicted ASR output(s)).

For example, when the on-device speech ASR model 154A is an end-to-end speech recognition model, the on-device ASR engine 124 can generate the predicted textual segment 103A directly using the model. For instance, the on-device speech ASR model 154A can be an end-to-end model used to generate predicted text on a character-by-character basis (or another token-by-token basis). One non-limiting example of such an end-to-end model used to generate predicted text on a character-by-character basis is a recurrent neural network transducer (RNN-T) model. An RNN-T model is a form of sequence-to-sequence model that does not employ attention mechanisms. Unlike most sequence-to-sequence models, which typically need to process the entire input sequence (e.g., an audio data waveform, or mel-frequency cepstral coefficients (MFCCs) or other representation) to produce an output the predicted textual segment(s), an RNN-T model can be used to continuously process input samples and stream output symbols (e.g., characters of the alphabet).

Also, for example, when the on-device ASR model 154A is not an end-to-end speech recognition model, the on-device ASR engine 124 can instead generate predicted phonemes 103B (and/or other representations). For instance, with such models the predicted phonemes 103B (and/or other representations) are then utilized by the on-device ASR engine 124 to determine predicted textual segment(s) that conform to the sequence of phonemes. In doing so, the on-device ASR engine 124 can optionally employ a decoding graph, a lexicon, and/or other resource(s).

When the on-device ASR engine 124 generates the predicted textual segment 103A, it is provided to gradient engine 126. Gradient engine 126 compares the predicted textual segment 103A to the textual segment 101A to generate a gradient 105. The gradient may be derived from a loss function used to train the model, such that the gradient represents a value of that loss function (or a derivative thereof) obtained from comparison of the ground truth output to the predicted output. For example, when the predicted textual segment 103A and the textual segment 101A match, the gradient engine 126 can generate a zero gradient. Also, for example, when the predicted textual segment 103A and the textual segment 101 do not match, the gradient engine 126 can generate a non-zero gradient that is optionally dependent on the extent of the mismatching. The extent of the mismatching can be based on an extent of mismatching between characters of the textual segments, an extent of phoneme mismatching between the textual segments, and/or based on other deterministic comparisons. As one non-limiting particular example, at each iteration of generating the predicted textual segment 103A, the on-device ASR engine 124 can generate a corresponding probability for each of a plurality of characters, and select the highest probability character as the "next" character. The gradient engine 126 can, in such an example, determine a gradient based on comparing the predicted probabilities at each iteration to ground truth probabilities for each iteration (i.e., where the ground truth character at each iteration is the "next" character in the textual segment 101A and is assigned a "1" probability, and all others a "0" probability).

When the on-device ASR engine 124 generates the predicted phonemes 103B, they are provided to gradient engine 126. Gradient engine 126 compares the predicted phonemes 103B to ground truth sequence of phonemes 104 determined to correspond to the textual segment 101A. In some implementations, phoneme engine 127 can access tokens-to-phonemes mapping 157 to determine the ground truth sequence of phonemes 104 that correspond to the textual segment 101A. As an example, when the predicted phonemes 103B and the phonemes 104 match, the gradient engine 126 can generate a zero gradient. As another example, when the predicted phonemes 103B and the phonemes 104 do not match, the gradient engine 126 can generate a non-zero gradient that is optionally dependent on the extent of the mismatching. The extent of the mismatching can be based on a quantity of mismatched phonemes, a quantity of incorrectly ordered phonemes, and/or a distance (in phoneme space) between mismatched phoneme(s), and/or based on other deterministic comparisons.

It is noted that in implementations where additional textual segment(s) is pre-pended and/or appended to the textual segment 101A as described herein, the predicted textual segment 103A will also include a prediction of the pre-pended and/or appended additional textual segment(s). The prediction of the pre-pended and/or appended additional segment(s) can be ignored in generating the gradient (e.g., term(s) discarded that correspond to the appended additional segment) or, alternatively, the pre-pended and/or appended additional segment(s) can be considered in generating the gradient (e.g., the prediction can be compared to the textual segment with the appended additional textual segment).

The gradient engine 126 provides the gradient 105 to on-device ASR training engine 128 and/or transmits the gradient 105 to remote system 160. The on-device ASR training engine 128, when it receives the gradient 105, uses the gradient 105 to update the on-device ASR model 154A. For example, the on-device ASR training engine 128 can utilize backpropagation and/or other techniques to update the on-device ASR model 154A. It is noted that, in some implementations, the on-device ASR training engine 128 can utilize batch techniques to update the on-device ASR model 154A based on the gradient 105 and additional gradients determined locally at the client device 110 on the basis of additional textual segments.

When the remote system 160 receives the gradient 105, a remote training engine 162 of the remote system uses the gradient 105, and additional gradients 106 from additional client devices 170, to update global weights of a global ASR model 154B. The additional gradients 106 from the additional client devices 170 can each be generated based on the same or similar techniques as described above with respect to gradient 105 in FIG. 1A (but on the basis of locally identified textual segments 101A that are particular to those additional client devices 170). Although not depicted in FIG. 1A, the additional gradients can additionally or alternatively be generated at the remote system 160 based on the same or similar techniques as described above with respect to gradient 105 in FIG. 1A (but on the basis of remotely identified textual segments 101A that are accessible by the remote system 160).

An update distribution engine 164 can, responsive to one or more conditions being satisfied, provide, to client device 110 and/or other client device(s), the updated global weights and/or the updated global ASR model itself, as indicated by 107. The one or more conditions can include, for example, a threshold duration and/or quantity of training since updated weights and/or an updated speech recognition model was last provided. The one or more conditions can additionally or alternatively include, for example, a measured improvement to the updated speech recognition model and/or passage of a threshold duration of time since updated weights and/or an updated speech recognition model was last provided. When the updated weights are provided to the client device 110, the client device 110 can replace local weights, of the on-device ASR model 154A, with the updated weights. When the updated global ASR model is provided to the client device 110, the client device 110 can replace the on-device ASR model 154A with the updated global ASR model 154B.

By transmitting the gradient 105 to the remote system 160, and updating the global weights of the global ASR model 154B based on the gradient 105, the on-device ASR model 154A can be utilized to update the global ASR model 154B. For example, assume the on-device ASR model 154A knows that the sound "fran-swaz" corresponds to a textual segment of "Françoise" since it was previously corrected at the client device 110 and the on-device ASR model 154A was updated based on a gradient generated based on this correction. However, the global ASR model 154B may not know that the sound "fran-swaz" corresponds to a textual segment of "Françoise". Nonetheless, by updating the global ASR model 154B based on a gradient that is generated based on this correction, the global ASR model 154B can also learn that the sound "fran-swaz" corresponds to a textual segment of "Françoise", rather than "François" or "Francis". In contrast, if the audio data corresponding to the sound "fran-swaz" was stored at the remote system 160 and annotated by a human, the human may not know that "fran-swaz" corresponds to "Françoise" and incorrectly annotate the sound "fran-swaz" as corresponding to "François" or "Francis" (e.g., a hard negative). In this example, the global ASR model 154B may be updated to learn this error (e.g., to select the textual segment "François" or "Francis" instead of Françoise" in response to receiving audio data that captures the sound "fran-swaz").

Figure 1B:
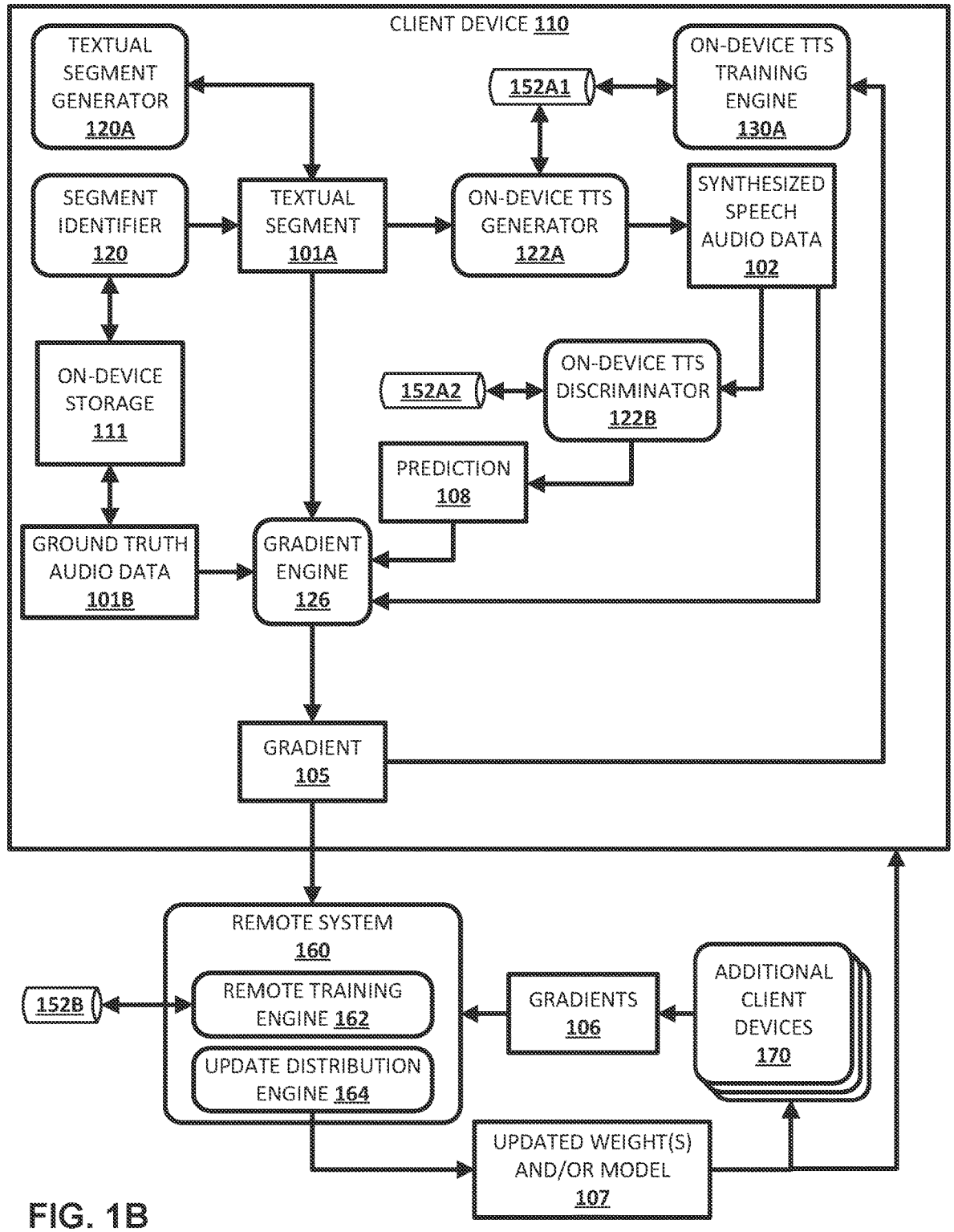
FIG. 1B depicts an example process flow for updating an on-device TTS generator based on a gradient generated locally at a client device and/or transmitting the gradient to a remote system for updating a global TTS generator model, in accordance with various implementations.

Turning now to FIGS. 1B, an example process flow for updating an on-device TTS generator model based on a gradient generated locally at a client device and/or transmitting the gradient to a remote system for updating a global TTS generator model is depicted. The client device 110 of FIG. 1A can additionally or alternatively perform instances of the process flow illustrated in FIG. 1B. In some implementations, and in contrast with FIG. 1A, the trained on-device TTS generator 122A provides the synthesized speech audio data 102 directly to the gradient engine 126 rather than to the on-device ASR engine 124. Gradient engine 126 compares the synthesized speech audio data 102 to ground truth audio data 101B. More particularly, the gradient engine 126 can compare acoustic features of the synthesized speech audio data 102 and the ground truth audio data 101B. The acoustic features can include, for example, audio waveforms, mel-frequency cepstral coefficients (MFCCs), mel-filterbank features, values associated with one or more prosodic properties, neural representations of the audio data (e.g., respective embeddings of the ground truth audio data and the predicted synthesized speech audio data), and/or other acoustic features of the synthesized speech audio data and the ground truth audio data that can be compared. The ground truth audio data 101B can be stored in association with the textual segment 101B processed by the on-device TTS generator 122A (e.g., in on-device storage 111), and can be identified along with the textual segment 101A. The gradient may be derived from a loss function used to train the model, such that the gradient represents a value of that loss function (or a derivative thereof) obtained from comparison of the ground truth output to the predicted output. For example, when the acoustic features of the synthesized speech audio data 102 and the ground truth audio data 101B match, the gradient engine 126 can generate a zero gradient. Also, for example, when the acoustic features of the synthesized speech audio data 102 and the ground truth audio data 101B do not match, the gradient engine 126 can generate a non-zero gradient that is optionally dependent on the extent of the mismatching. The extent of the mismatching can be based on an extent of mismatching between characters of the textual segments, an extent of phoneme mismatching between the textual segments, and/or based on other deterministic comparisons.

In some additional or alternative implementations, and in contrast with FIG. 1A, the trained on-device TTS generator 122A provides the synthesized speech audio data 102 to the on-device TTS discriminator 122B rather than to the on-device ASR engine 124 (or directly to the gradient engine 126). The on-device TTS discriminator 122B can process the synthesized speech audio data 102 using the on-device TTS discriminator model 152A2 to make a prediction 108. The prediction 108 made by the on-device TTS discriminator model 152A2 can indicate whether the synthesized speech audio data 102 corresponds to a spoken utterance (or portion thereof) of the user of the client device 110 or synthesized speech generated using the on-device TTS generator model 152A1. The on-device TTS discriminator 122B provides the prediction 108 to the gradient engine 126. The prediction 108 can be, for example, a binary value (e.g., where "0" corresponds to synthesized speech and where "1" corresponds to a spoken utterance of the user of the client device 110), a semantic label (e.g., where "synthesized" or "fake" corresponds to synthesized speech and where "human" or "real" corresponds to a spoken utterance of the user of the client device 110), and/or a probability (e.g., "0.65" associated with "synthesized" and "0.35" associated with "real"). Gradient engine 126 can generate the gradient 126 based on the prediction 108. For example, when the prediction 108 includes a binary value or semantic label and the prediction 108 is correct, the gradient engine 126 can generate a zero gradient. Also, for example, when prediction 108 includes a probability and the prediction 108 is not correct, the gradient engine 126 can generate a non-zero gradient that is optionally dependent on the extent of the mismatching between the probability and a ground truth probability associated with the correct prediction.

It is noted that in implementations where additional textual segment(s) is pre-pended and/or appended to the textual segment 101A as described herein, the synthesized speech audio data 102 will also include synthesized speech corresponding to the pre-pended and/or appended additional textual segment(s). The synthesized speech corresponding to the pre-pended and/or appended additional segment(s) can be ignored in generating the gradient (e.g., term(s) discarded that correspond to the appended additional segment) or, alternatively, the pre-pended and/or appended additional segment(s) can be considered in generating the gradient (e.g., the prediction can be compared to the textual segment with the appended additional textual segment).

The gradient engine 126 provides the gradient 105 to on-device TTS generator training engine 130A and/or transmits the gradient 105 to the remote system 160. The on-device TTS generator training engine 130A, when it receives the gradient 105, uses the gradient 105 to update the on-device TTS generator model 152A1. For example, the on-device TTS generator training engine 130A can utilize backpropagation and/or other techniques to update the on-device TTS generator model 152A1. It is noted that, in some implementations, the on-device TTS generator training engine 130A can utilize batch techniques to update the on-device TTS generator model 152A1 based on the gradient 105 and additional gradients determined locally at the client device 110 on the basis of additional textual segments.

When the remote system 160 receives the gradient 105, a remote training engine 162 of the remote system uses the gradient 105, and additional gradients 106 from additional client devices 170, to update global weights of a global TTS generator model 152B. The additional gradients 106 from the additional client devices 170 can each be generated based on the same or similar technique as described above with respect to gradient 105 in FIG. 1B (but on the basis of locally identified textual segments 101A that are particular to those additional client devices 170). Although not depicted in FIG. 1B, the additional gradients can additionally or alternatively be generated at the remote system 160 based on the same or similar techniques as described above with respect to gradient 105 in FIG. 1B (but on the basis of remotely identified textual segments 101A that are accessible by the remote system 160).

An update distribution engine 164 can, responsive to one or more conditions being satisfied, provide, to client device 110 and/or other client device(s), the updated global weights and/or the updated global TTS generator model itself, as indicated by 107. The one or more conditions can include, for example, a threshold duration and/or quantity of training since updated weights and/or an updated speech recognition model was last provided. The one or more conditions can additionally or alternatively include, for example, a measured improvement to the updated speech recognition model and/or passage of a threshold duration of time since updated weights and/or an updated speech recognition model was last provided. When the updated weights are provided to the client device 110, the client device 110 can replace local weights, of the on-device TTS generator model 152A1, with the updated weights. When the updated global TTS generator model is provided to the client device 110, the client device 110 can replace the on-device TTS generator model 152A1 with the updated global TTS generator model 152B.

Figure 2:
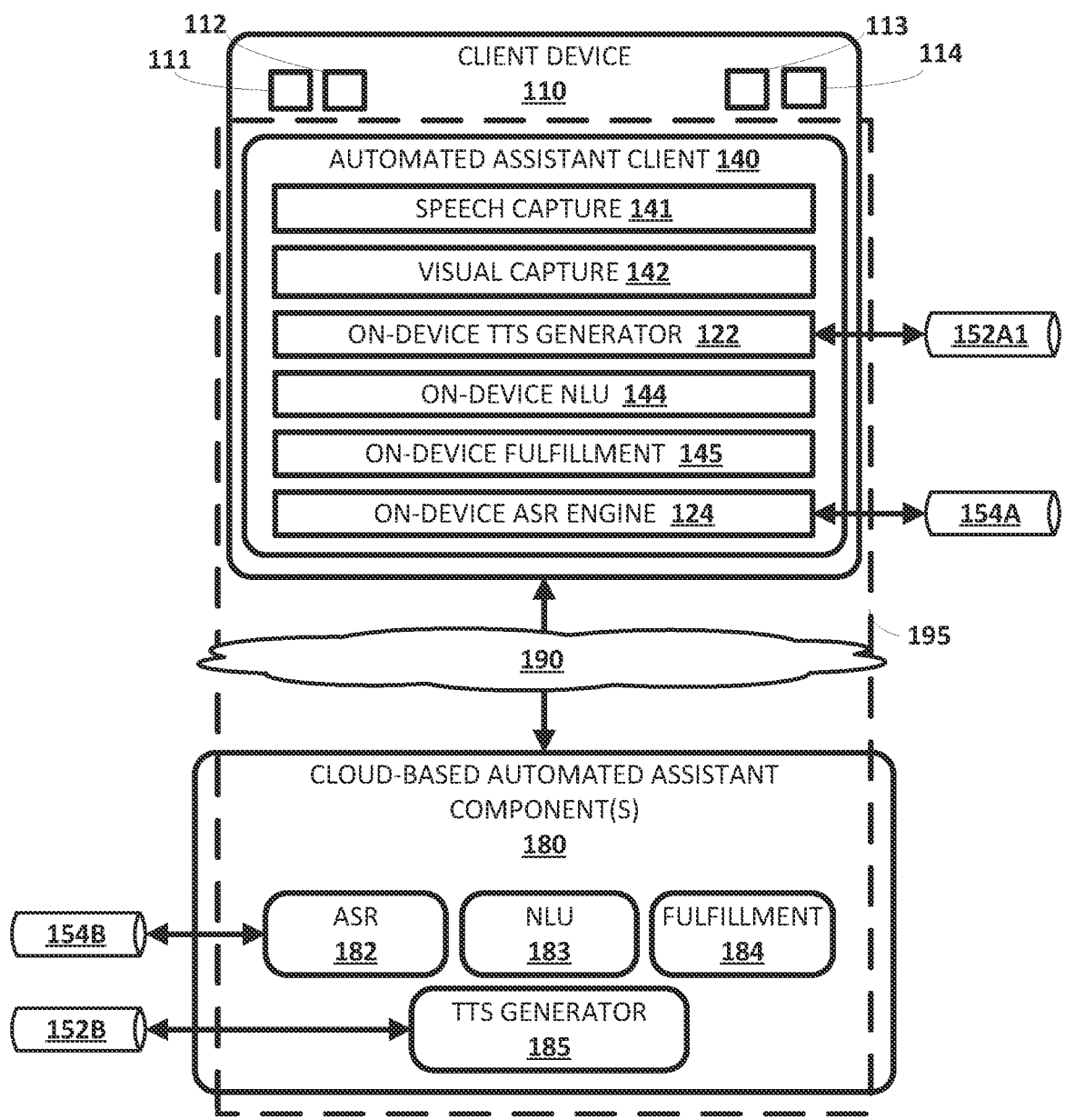
FIG. 2 is a block diagram of an example environment that includes various components from FIGS. 1A and 1B, and in which implementations disclosed herein may be implemented.

Turning now to FIG. 2, the client device 110 is illustrated in an implementation where the on-device TTS generator 122 and the on-device ASR engine 124 of FIGS. 1A and 1B are included as part of (or in communication with) an automated assistant client 140. The on-device TTS generator model 152A1 is illustrated interfacing with the on-device TTS generator 122, and the on-device ASR model 154A is illustrated interfacing with the on-device ASR engine 124. Other components from FIG. 1A are not illustrated in FIG. 2 for simplicity. FIG. 2 illustrates one example of how the on-device TTS generator 122 and on-device TTS generator model 152A1 can be utilized in generating synthesized speech audio data the automated assistant client 140 causes to be rendered at the client device 110. Further, FIG. 2 illustrates one example of how the on-device ASR engine 124 and on-device ASR model 154A can be utilized in generating recognized text that is utilized by an automated assistant client 140 in performing various actions.

The client device 110 in FIG. 2 is illustrated with microphone(s) 111, speaker(s) 112, camera(s) and/or other vision component(s) 113, and display(s) 114 (e.g., a touch-sensitive display). The client device 110 at least selectively executes the automated assistant client 140. The automated assistant client 140 includes, in the example of FIG. 1B, the on-device TTS generator 122, the on-device ASR engine 124, an on-device natural language understanding (NLU) engine 144, and an on-device fulfillment engine 145. The automated assistant client 140 further includes speech capture engine 141 and visual capture engine 142. The automated assistant client 140 can include additional and/or alternative engines, such as a voice activity detector (VAD), an endpoint detector, a hotword detector, and/or other engine(s).

One or more cloud-based automated assistant components 180 can optionally be implemented on one or more computing systems (collectively referred to as a "cloud" computing system) that are communicatively coupled to client device 110 via one or more local and/or wide area networks (e.g., the Internet) indicated generally at 190. The cloud-based automated assistant components 180 can be implemented, for example, via a cluster of high-performance servers.

In various implementations, an instance of an automated assistant client 140, by way of its interactions with one or more cloud-based automated assistant components 180, may form what appears to be, from a user's perspective, a logical instance of an automated assistant 195 with which the user may engage in a human-to-computer interactions (e.g., spoken interactions, gesture-based interactions, and/or touch-based interactions).

The client device 110 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The vision component(s) 113 can take various forms, such as monographic cameras, stereographic cameras, a LIDAR component (or other laser-based component(s)), a radar component, etc. The vision component(s) 113 may be used, e.g., by visual capture engine 142, to capture vision frames (e.g., image frames, laser-based vision frames) of an environment in which client device 110 is deployed. In some implementations, such vision frame(s) can be utilized to determine whether a user is present near the client device 110 and/or a distance of the user (e.g., the user's face) relative to the client device. Such determination(s) can be utilized, for example, in determining whether to activate on-device ASR engine 124.

Speech capture engine 141 can be configured to capture a user's speech and/or other audio data captured via microphone(s) 111. As described herein, such audio data can be utilized (optionally after pre-processing) by on-device ASR engine 124. For example, on-device ASR engine 124 can process audio data that captures a spoken utterance, utilizing on-device ASR model 154A, to generate recognized text that corresponds to the spoken utterance. On-device NLU engine 140 performs on-device natural language understanding on the recognized text to generate NLU data. NLU engine 144 can optionally utilize one or more on-device NLU models (not illustrated in FIG. 1B for simplicity) in generating the NLU data. NLU data can include, for example, intent(s) that correspond to the spoken utterance and optionally parameter(s) (e.g., slot values) for the intent(s). Further, on-device fulfillment engine 145 generates fulfillment data using the NLU data. On-device fulfillment engine 145 can optionally utilize one or more on-device fulfillment models (not illustrated in FIG. 2 for simplicity) in generating the fulfillment data. This fulfillment data can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (via on-device TTS generator 122 using on-device TTS generator model(s) 125A1)), interacting with locally installed applications, transmitting command(s) to IoT device(s), and/or other action(s).

Display(s) 114 can be utilized to render streaming text transcriptions from the on-device speech recognizer 124. Display(s) 114 can further be one of the user interface output component(s) through which visual portion(s) of a response, from automated assistant client 140, is rendered.

In some implementations, cloud-based automated assistant component(s) 180 can include a remote ASR engine 182 that performs speech recognition using global ASR model(s) 154B, a remote NLU engine 183 that performs natural language understanding, a remote fulfillment engine 184 that generates fulfillment data, and/or a remote TTS generator 185 that generates synthesized speech audio data. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 180 can be utilized at least selectively. For example, such component(s) can be utilized in parallel with on-device component(s) and output from such component(s) utilized when local component(s) fail. For example, on-device fulfillment engine 145 can fail in certain situations (e.g., due to relatively limited resources of client device 160) and remote fulfillment engine 184 can utilize the more robust resources of the cloud to generate fulfillment data in such situations. Remote fulfillment engine 184 can be operated in parallel with on-device fulfillment engine 145 and its results utilized when on-device fulfillment fails, or can be invoked responsive to determining failure of on-device fulfillment engine 145.

In various implementations, an NLU engine (on-device 144 and/or remote 183) can generate annotated output that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with automated assistant 195. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 110. Another grammar, "[weather|forecast] today," may be matchable to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters").

Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local 145 and/or remote 184) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by the fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

Figure 3:
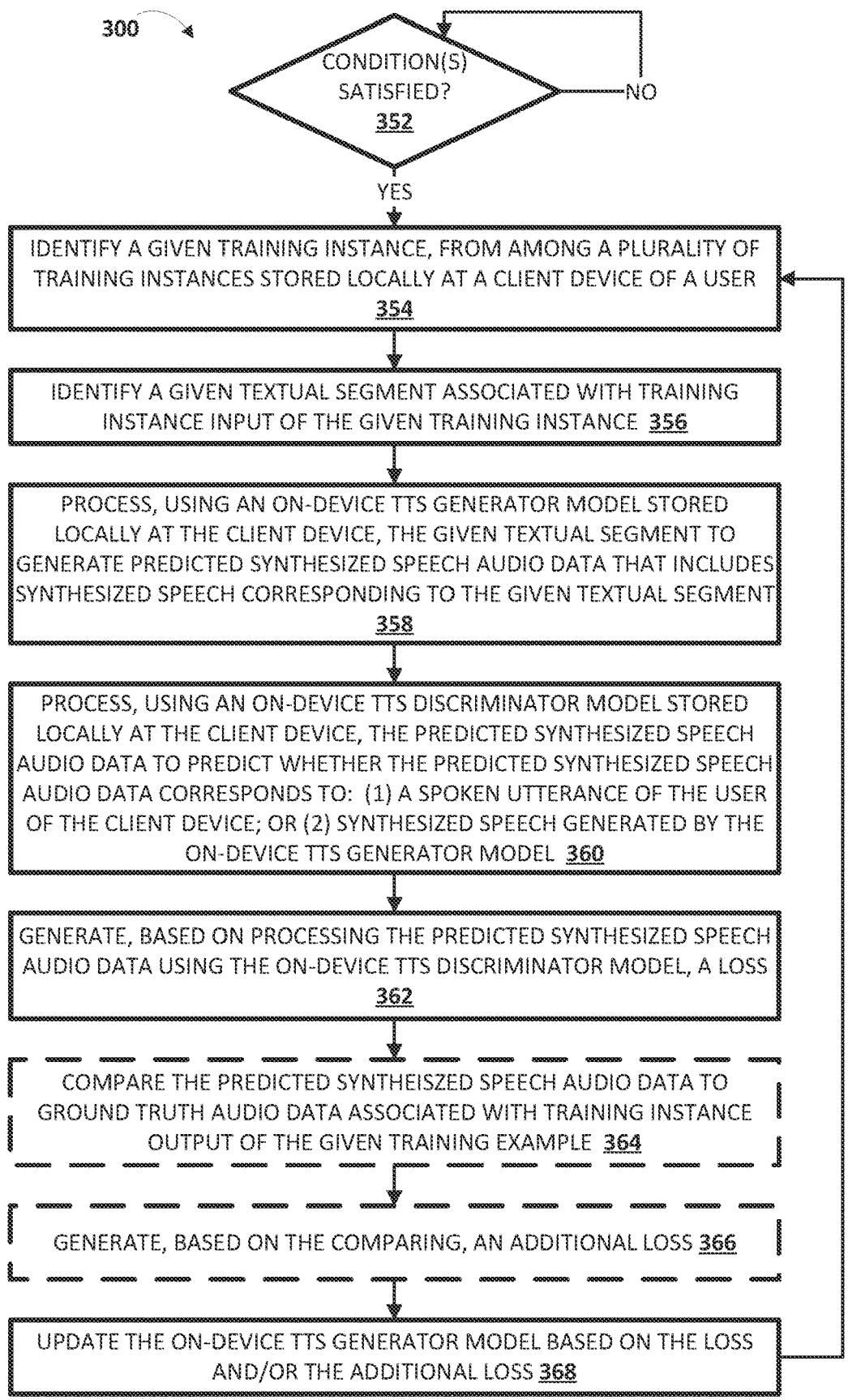
FIG. 3 depicts a flowchart illustrating an example method of training an on-device TTS generator model stored locally at a client device, in accordance with various implementations.

Turning now to FIG. 3, a flowchart illustrating an example method 300 of training an on-device TTS generator model stored locally at a client device is depicted. For convenience, the operations of the method 300 are described with reference to a system that performs the operations. This system of method 300 includes one or more processors and/or other component(s) of a client device. Moreover, while operations of the method 300 are shown in a particular order, this is not meant to be limiting. One or more operations may be reordered, omitted, or added.

At block 352, the system determines whether one or more conditions are satisfied. Although illustrated prior to block 354, it is noted that block 352 can also be performed before each of blocks 356, 358, 360, 362, 364 (if included), 368 (if included), and/or 368—and/or can instead be performed before only a subset of blocks 356, 358, 360, 362, 364 (if included), 368 (if included), and/or 368. In some implementations, block 352 includes determining whether a current state of the client device satisfies the one or more conditions. For example, the system can determine the current state of the client device based on sensor data from sensor(s) of the client device, and determine whether that current state of the client device satisfies the condition(s). The condition(s) can include, for example, that the client device is charging, that the client device has at least a threshold state of charge, that the client device is not currently moving and/or has not moved within a threshold amount of time (e.g., based on sensor data from accelerometer(s), magnetometer(s), and/or other sensor(s), and/or that the client device is connected to an unmetered network (e.g., WiFi) such that the user of the client device is not charged for the receiving and/or transmitting of data. If the system determines one or more of the conditions are satisfied, the system may proceed to block 354.

At block 354, the system identifies a given training instance, from among a plurality of training instances stored locally at the client device of a user. Each of the plurality of training instances can include training instance input and training instance output. The training instance input can include, for example, a given textual segment stored locally at the client device. The training instance output can include, for example, ground truth audio data corresponding to a spoken utterance of the user of the client device that corresponds to the given textual segment. The plurality of training instances can be generated locally at the client device of the user based on spoken utterances of the user that are received at the client device. In some implementations, in response to receiving a spoken utterance from the user of the client device, the client device may prompt the user to verify a transcription of the spoken utterance prior to utilizing audio data that captures the spoken utterance and/or a textual segment from the transcription as a training instance. In various implementations, the training examples can be generated by the device to include semantically diverse training instances (e.g., as described above with respect to textual segment generator 120A of FIGS. 1A and 1B).

At block 356, the system identifies a given textual segment associated with training instance input of the given training instance.

At block 358, the system processes, using an on-device TTS generator model stored locally at the client device, the given textual segment to generate predicted synthesized speech audio data. For example, the system can process a sequence of phonemes corresponding to the given textual segment, using the on-device TTS generator model, to generate the synthesized speech audio data. In some implementations, the system generates the synthesized speech audio data based on the given textual segment along with one or more additional textual segments appended before or after the given textual segment.

At block 360, the system processes, using an on-device TTS discriminator model stored locally at the client device, the predicted synthesized speech audio data to predict whether the predicted synthesized speech audio data corresponds to: (1) a spoken utterance of the user of the client device; or (2) synthesized speech generated by the on-device TTS generator model. The on-device TTS generator model utilized at block 358 and the on-device TTS discriminator model utilized at block 360 may be portions of a GAN model. The goal of the on-device TTS generator model is to generate synthesized speech audio data that includes synthesized speech that the one-device TTS discriminator model predicts as corresponding to a spoken utterance of the user of the client device.

At block 362, the system generates, based on processing the predicted synthesized speech audio data using the on-device TTS discriminator model, a loss. The loss may be considered in adversarial loss generated in training the on-device TTS generator model of the GAN model. If the on-device TTS discriminator model predicts that the synthesized speech audio data corresponds to synthesized speech generated by the on-device TTS generator model, then the adversarial loss may be larger than if the on-device TTS discriminator model predicts that the synthesized speech audio data corresponds to a spoken utterance of the user of the client device.

In some implementations, the method 300 of FIG. 3 may include blocks 364 and 362. If blocks 364 and 366 are included, the system compares the predicted synthesized speech audio data to ground truth audio data associated with training instance output of the given training example, and generates an additional loss based on the comparing at block 364. The system can compare acoustic features of the synthesized speech audio data to the audio data of the training instance output to generate the additional loss. The acoustic features can include, for example, audio waveforms, mel-frequency cepstral coefficients (MFCCs), mel-filterbank features, values associated with one or more prosodic properties, neural representations of the audio data (e.g., respective embeddings of the ground truth audio data and the predicted synthesized speech audio data), and/or other acoustic features of the synthesized speech audio data and the ground truth audio data that can be compared.

At block 368, the system updates the on-device TTS generator model based on the loss and/or the additional loss. By updating the on-device TTS generator model based on the loss and/or the additional loss, the on-device TTS generator model is trained to include voice characteristics of the user of the client device. Although the on-device TTS generator model is described herein as being trained to include voice characteristics of the user, it should be understood that the synthesized speech generated using a trained on-device TTS generator model is not an exact match of the speech of the user. In other words, the on-device TTS generator model can be trained to include prosodic properties (e.g., one or more of intonation, tone, stress, rhythm, tempo, or pause) that are indicative of speech of the user of the client device.

Figure 4:
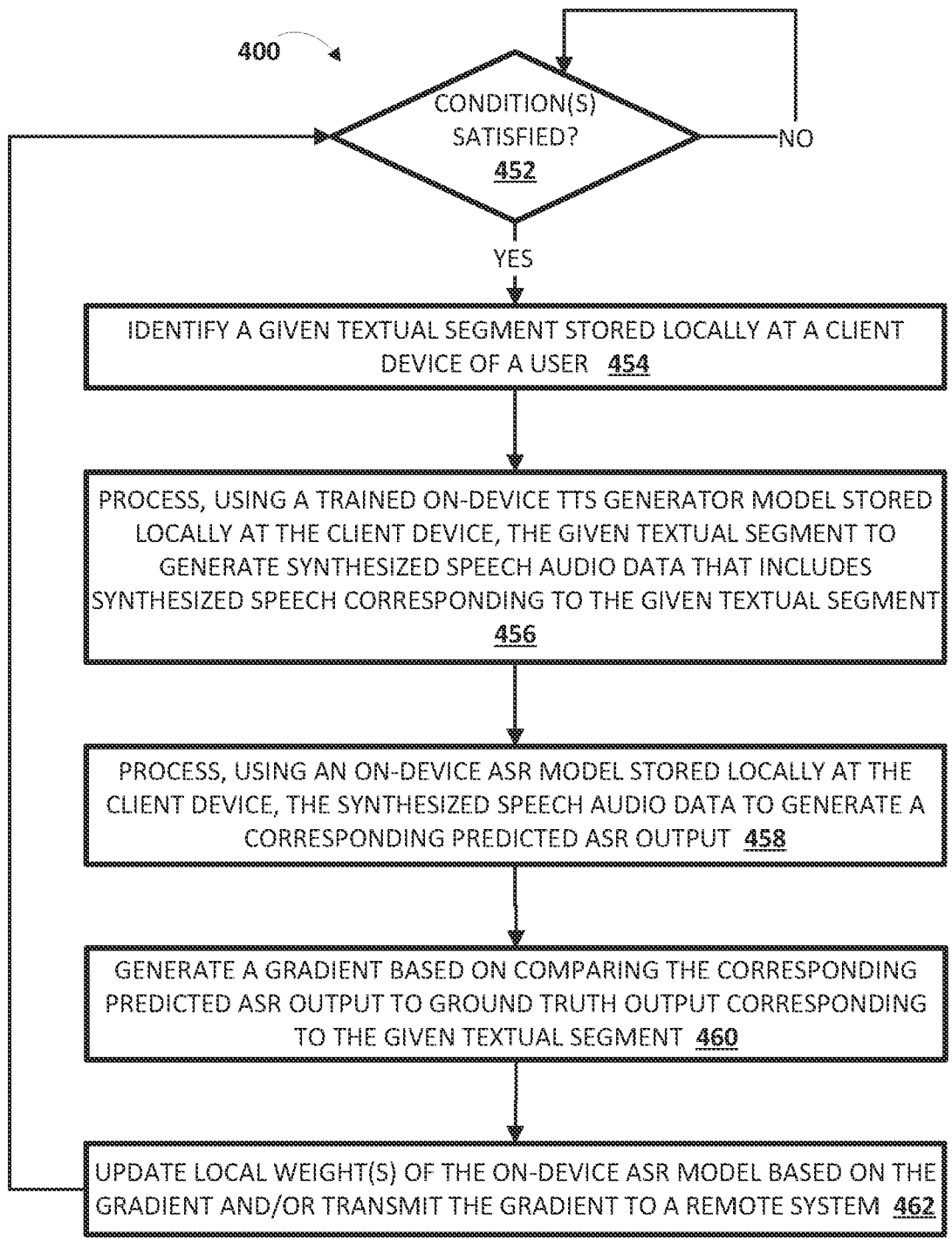
FIG. 4 depicts a flowchart illustrating an example method of generating a gradient, locally at a client device, and utilizing the generated gradient to update weight(s) of an on-device ASR model and/or transmitting the gradient to a remote system, in accordance with various implementations.

Turning now to FIG. 4, a flowchart illustrating an example method 400 of generating a gradient, locally at a client device, and utilizing the generated gradient to update weight(s) of an on-device ASR model and/or transmitting the gradient to a remote system is depicted. For convenience, the operations of the method 400 are described with reference to a system that performs the operations. This system of method 400 includes one or more processors and/or other component(s) of a client device. Moreover, while operations of the method 400 are shown in a particular order, this is not meant to be limiting. One or more operations may be reordered, omitted, or added.

At block 452, the system determines whether one or more conditions are satisfied. Although illustrated prior to block 454, it is noted that block 452 can also be performed before each of blocks 456, 458, 460, and/or 462—and/or can instead be performed before only a subset of blocks 456, 458, 460, and/or 462. In some implementations, block 352 includes determining whether a current state of the client device satisfies the one or more conditions. The one or more conditions are described in greater detail herein (e.g., with respect to block 352 of FIG. 3). If the system determines one or more of the conditions are satisfied, the system may proceed to block 354.

At block 454, the system identifies a given textual segment stored locally at a given client device of a user.

At block 456, the system processes, using a trained on-device TTS generator model stored locally at the client device, the given textual segment to generate synthesized speech audio data that includes synthesized speech corresponding to the given textual segment. The trained on-device TTS generator model may be trained based on performing multiple instances of the method 300 of FIG. 3. For example, the system can process a sequence of phonemes corresponding to the given textual segment, using the on-device TTS generator model, to generate the synthesized speech audio data. In some implementations, the system generates the synthesized speech audio data based on the given textual segment along with one or more additional textual segments appended before or after the given textual segment.

At block 458, the system processes, using an on-device ASR model stored locally at the client device, the synthesized speech audio data to generate a corresponding predicted ASR output. The corresponding predicted ASR output can include, for example, corresponding predicted textual segment(s), corresponding sequence(s) of predicted phoneme(s), and/or other predicted ASR output(s). In some implementations, the on-device ASR model is an end-to-end speech recognition model and the system generates predicted output that is the corresponding predicted textual segment. In some other implementations, the on-device ASR model is not an end-to-end speech recognition model, and the system generates a sequence of predicted phonemes and/or another predicted representation. The corresponding predicted textual segment can be determined based on the predicted phonemes and/or another predicted representation.

At block 460, the system generates a gradient based on comparing the corresponding predicted ASR output to ground truth output corresponding to the given textual segment. For example, when the system generates predicted output that is the corresponding predicted textual segment, the predicted textual segment can be compared with the given textual segment in generating the gradient. Also, for example, when the system generates a sequence of predicted phonemes and determines the predicted textual segment based on the sequence of predicted phonemes, the sequence of predicted phonemes can be compared with a sequence of phonemes, that corresponds to the given textual segment, in generating the gradient.

At block 462, the system updates local weight(s) of the on-device ASR model based on the gradient of block 560 and/or transmits (e.g., via the Internet or other wide area network) the gradient of block 460 to a remote system (without transmitting any of the given textual segment, the synthesized speech audio data, and the corresponding predicted textual segment). When the gradient is transmitted to the remote system, the remote system utilizes the generated gradient, and additional gradients from additional client devices, to update global weight(s) of a global ASR model. After block 462, the system then proceeds back to block 452.

Figure 5:
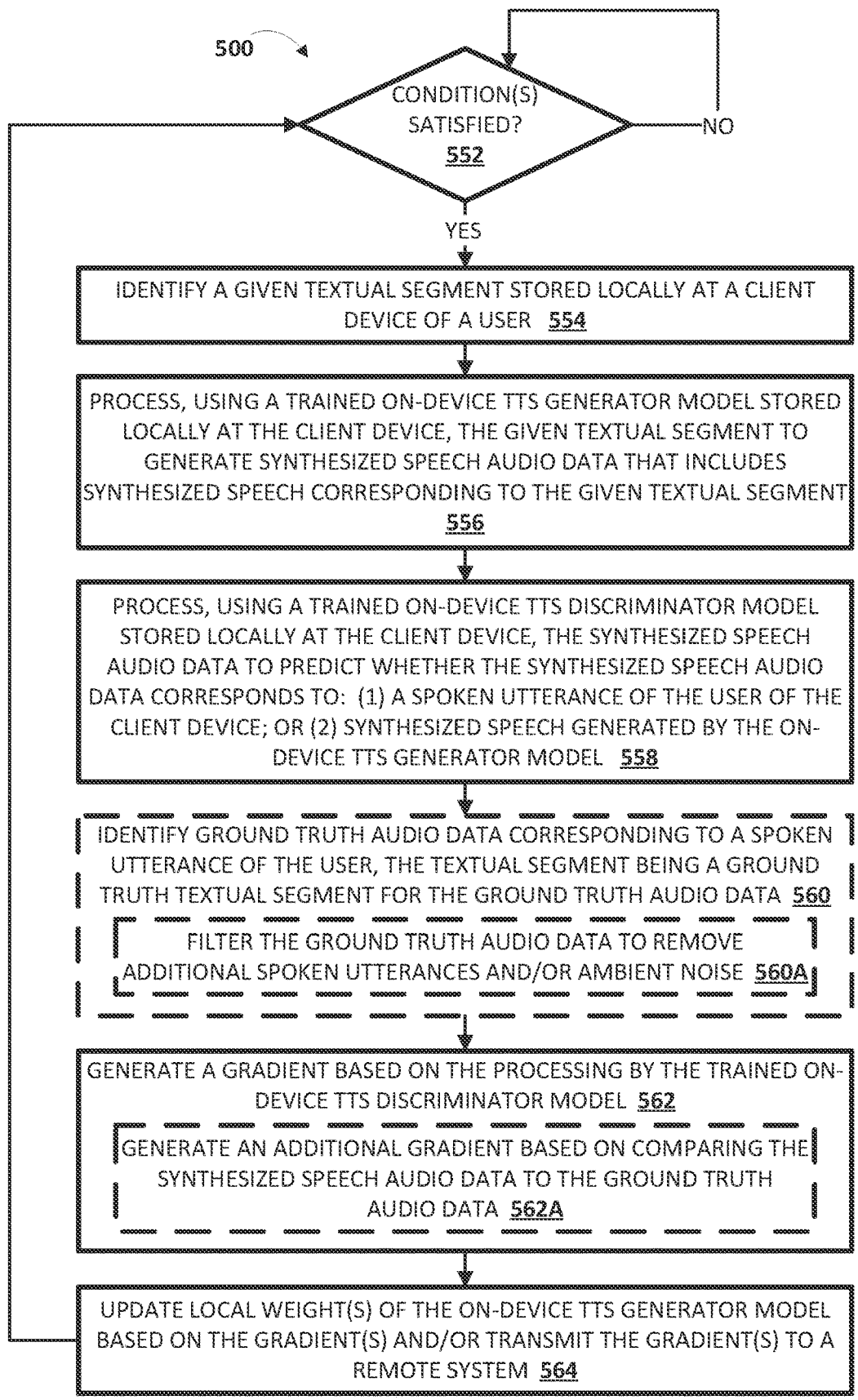
FIG. 5 depicts a flowchart illustrating an example method of generating a gradient, locally at a client device, and utilizing the generated gradient to update weight(s) of an on-device TTS generator model and/or transmitting the gradient to a remote system, in accordance with various implementations.

Turning now to FIG. 5, a flowchart illustrating an example method 500 of generating a gradient, locally at a client device, and utilizing the generated gradient to update weight(s) of an on-device TTS generator model and/or transmitting the gradient to a remote system is depicted. For convenience, the operations of the method 500 are described with reference to a system that performs the operations. This system of method 500 includes one or more processors and/or other component(s) of a client device. Moreover, while operations of the method 500 are shown in a particular order, this is not meant to be limiting. One or more operations may be reordered, omitted, or added.

At block 552, the system determines whether one or more conditions are satisfied. Although illustrated prior to block 454, it is noted that block 552 can also be performed before each of blocks 556, 558, 560, 562, and/or 564—and/or can instead be performed before only a subset of blocks 556, 558, 560, 562, and/or 564. In some implementations, block 552 includes determining whether a current state of the client device satisfies the one or more conditions. The one or more conditions are described in greater detail herein (e.g., with respect to block 352 of FIG. 3). If the system determines one or more of the conditions are satisfied, the system may proceed to block 554.

At block 554, the system identifies a given textual segment stored locally at a given client device of a user.

At block 556, the system processes, using a trained on-device TTS generator model stored locally at the client device, the given textual segment to generate synthesized speech audio data that includes synthesized speech corresponding to the given textual segment. For example, the system can process a sequence of phonemes corresponding to the given textual segment, using the on-device TTS generator model, to generate the synthesized speech audio data. In some implementations, the system generates the synthesized speech audio data based on the given textual segment along with one or more additional textual segments appended before or after the given textual segment.

At block 558, the system processes, using a trained on-device TTS discriminator model stored locally at the client device, the synthesized speech audio data to predict whether the synthesized speech audio data corresponds to: (1) a spoken utterance of the user of the client device; or (2) synthesized speech generated by the on-device TTS generator model. The on-device TTS generator model utilized at block 556 and the on-device TTS discriminator model utilized at block 558 may be portions of a GAN model. The goal of the on-device TTS generator model is to generate synthesized speech audio data that includes synthesized speech that the one-device TTS discriminator model predicts as corresponding to a spoken utterance of the user of the client device.

In some implementations, the method 500 may include optional block 560. If block 560 is included, the system identifies ground truth audio data corresponding to a spoken utterance of the user, the textual segment being a ground truth textual segment for the ground truth audio data. The ground truth audio data can be stored in association with the given textual segment stored locally at the given client device (e.g., in on-device storage 111 of FIGS. 1A and 1B). In some versions of those implementations, block 560 may include optional sub-block 560A. If sub-block 560A is included, the system filters the ground truth audio data to remove additional spoken utterances and/or ambient noise. The system can filter the ground truth audio data to remove the additional spoken utterances by using one or more known techniques. For example, the system can utilize a voice filtering model that process the ground truth audio data and a speaker embedding associated with the user of the client device to generate ground truth audio data that only includes the spoken utterance of the user and removes any audio data that does not match the speaker embedding associated with the user of the client device. As another example, the system can utilize a filtering model or algorithm to remove the ambient noise to generate ground truth audio data that isolates the spoken utterance of the user.

At block 562, the system generates a gradient based on the processing by the trained on-device TTS discriminator model at block 558. The gradient generated at block 562 may be similar to the adversarial loss for the GAN model (e.g., described with respect to block 362 of FIG. 3). In some implementations when optional block 560 is included, block 562 may include sub-block 562A. If sub-block 562A is included, the system generates a gradient based on comparing the synthesized speech audio data to the ground truth audio data. The system can compare acoustic features of the synthesized speech audio data to the ground truth audio data to generate the gradient. The acoustic features can include, for example, audio waveforms, mel-frequency cepstral coefficients (MFCCs), mel filterbank features, values associated with one or more prosodic properties, and/or other acoustic features of the synthesized speech audio data and the ground truth audio data that can be compared.

At block 564, the system updates local weight(s) of the on-device TTS generator model based on the gradient of block 562 (and optionally the additional gradient of sub-block 562A) and/or transmits (e.g., via the Internet or other wide area network) the gradient of block 562 (and optionally the additional gradient of sub-block 562A) to a remote system (without transmitting any of the given textual segment, and the synthesized speech audio data). When the gradient(s) are transmitted to the remote system, the remote system utilizes the generated gradient, and additional gradients from additional client devices, to update global weight(s) of a global TTS generator model. After block 564, the system then proceeds back to block 552.

Figure 6:
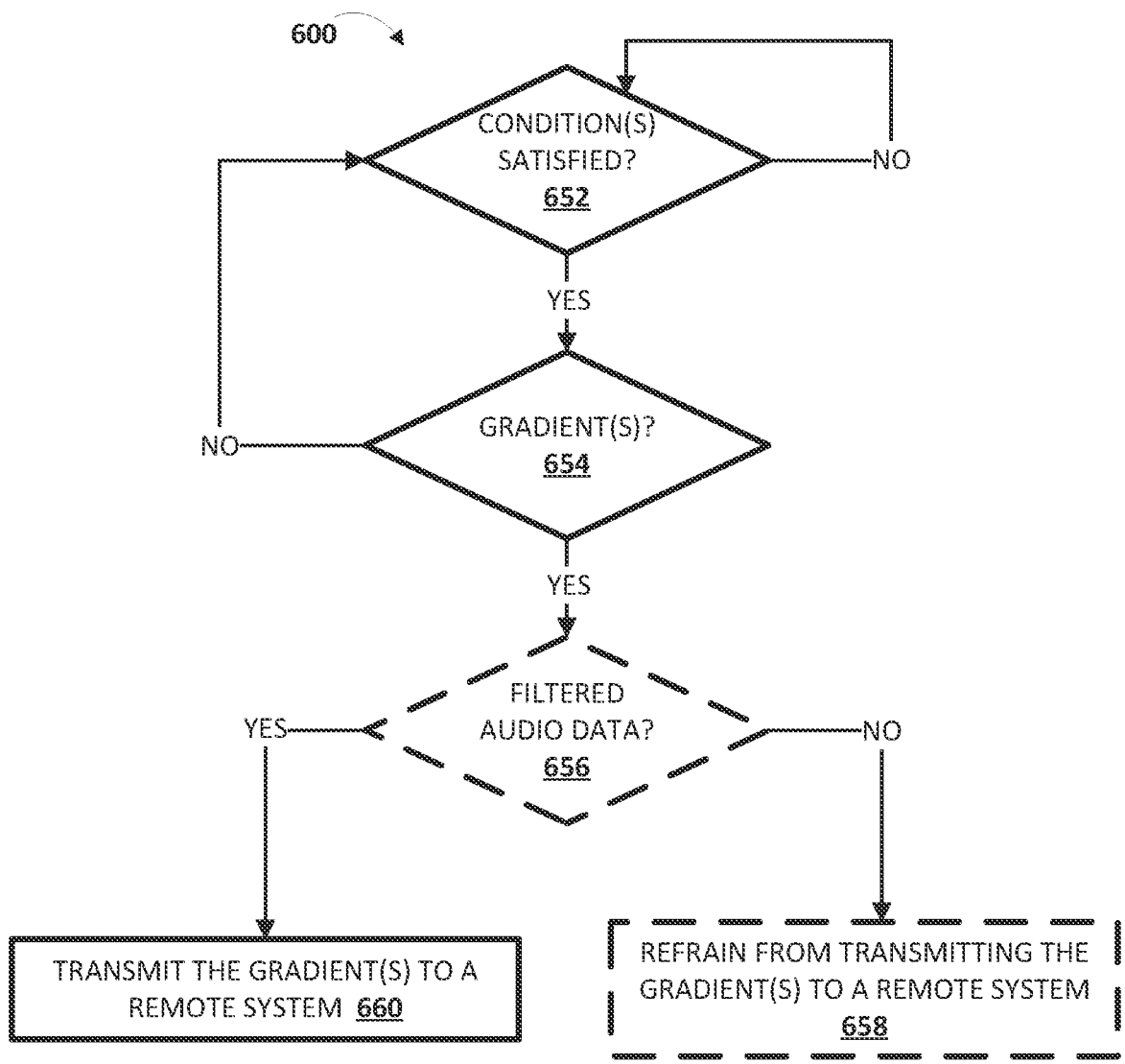
FIG. 6 depicts a flowchart illustrating an example method of transmitting, to a remote system, gradient(s) generated locally at a client device that is performing corresponding instances of the method of FIG. 4 and/or the method of FIG. 5, in accordance with various implementations.

Turning now to FIG. 6 a flowchart illustrating an example method 600 of transmitting, to a remote system, gradient(s) generated locally at a client device that is performing corresponding instances of the method 400 of FIG. 4 and/or the method 500 of FIG. 5 is depicted. For convenience, the operations of the method 600 are described with reference to a system that performs the operations. This system of method 600 includes one or more processors and/or other component(s) of a client device. Moreover, while operations of the method 600 are shown in a particular order, this is not meant to be limiting. One or more operations may be reordered, omitted, or added.

At block 652, the system determines whether one or more conditions are satisfied. Although illustrated prior to block 654, it is noted that block 652 can also be performed before block 656. In some implementations, block 652 includes determining whether a current state of the client device satisfies the one or more conditions. The one or more conditions are described in greater detail herein (e.g., with respect to block 352 of FIG. 3). If the system determines one or more of the conditions are satisfied, the system may proceed to block 654.

At block 654, the system determines whether a client device has generated gradient(s) by performing corresponding instances of the method 400 of FIG. 4 and/or the method 500 of FIG. 5. If the system determines that no gradient(s) have been generated at the client device, the system can continuously monitor whether any gradient(s) are generated at the client device while the condition(s) are satisfied at block 652. If the system determines that gradient(s) have been generated at the client device, then the system may proceed to block 656.

In some implementations, the method 600 may optionally include blocks 656 and 658. If block 656 is included, the system may determine whether any audio data (e.g., ground truth audio data) utilized in generating any of the gradient(s) were generated based on audio data that includes portion(s) of additional spoken utterances of additional humans that are in addition to the user of the client device and/or ambient noise that satisfies a noise threshold (e.g., as described with respect to optional sub-block 558A of FIG. 5). If the system determines that the gradient(s) were generated based on audio data that includes the portion(s) of the additional spoken utterances and/or the ambient noise that satisfies the noise threshold, but the audio data was not filtered, then the system may proceed to block 658. At block 658, the system refrains from transmitting the gradient(s) to a remote system. Although the system may refrain from transmitting the gradient(s) to the remote system, the system may still update an on-device model (e.g., an on-device TTS generator model and/or an on-device ASR model) based on the gradient(s). However, if the audio data was filtered, then the system may proceed to block 660. In implementations that omit blocks 656 and block 660, the system may proceed directly from block 654 to block 660.

At block 660, the system transmits (e.g., via the Internet or other wide area network) the gradient(s) of block 654 to a remote system (without transmitting data on which the gradient(s) are generated). When the gradient(s) are transmitted to the remote system, the remote system utilizes the generated gradient(s), and additional gradients from additional client devices, to update global weight(s) of global model(s). For example, the system can update weight(s) of a global ASR model if the gradient(s) of block 654 include gradient(s) generated based on instances of the method 400 of FIG. 4. Further, the system can update weight(s) of a global TTS generator model if the gradient(s) of block 654 include gradient(s) generated based on instances of the method 500 of FIG. 5. After block 660, the system then proceeds back to block 652.

Figure 7:
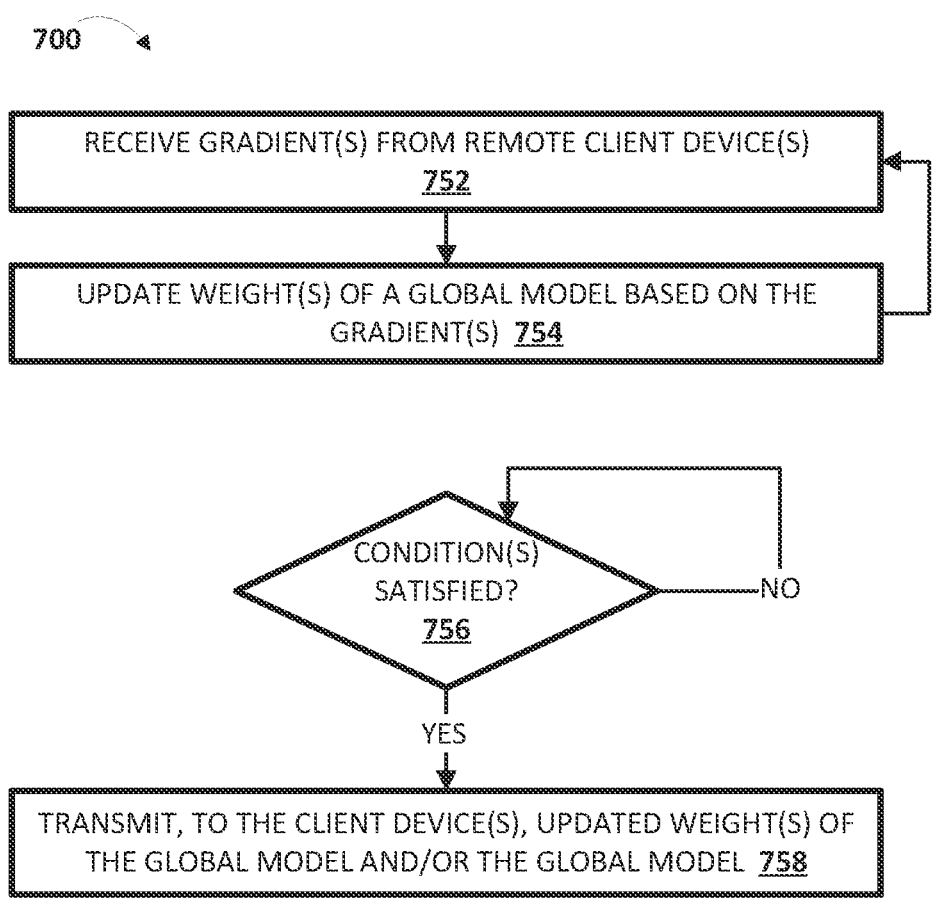
FIG. 7 depicts a flowchart illustrating an example method of updating weight(s) of global model(s) based on gradient(s) received from remote client device(s) that are performing corresponding instances of the method of FIG. 4 and/or the method of FIG. 5, and transmitting, to remote client device(s), the updated weight(s) and/or the updated global model(s), in accordance with various implementations.

Turning now to FIG. 7, a flowchart illustrating an example method 700 of updating weight(s) of global model(s) based on gradient(s) received from remote client device(s) that are performing corresponding instances of method 400 of FIG. 4 and/or method 500 of FIG. 5, and transmitting, to remote client device(s), the updated weight(s) and/or the updated global model(s) is depicted. For convenience, the operations of the method 300 are described with reference to a system that performs the operations. This system may include various components of various computer systems, such as one or more server devices. Moreover, while operations of the method 700 are shown in a particular order, this is not meant to be limiting. One or more operations may be reordered, omitted, or added.

At block 752, the system receives gradient(s) from remote client device(s). For example, the system can receive gradient(s) from a plurality of remote client devices that are performing corresponding instances of the method 400 of FIG. 4 and/or the method 500 of FIG. 5.

At block 754, the system updates weight(s) of a global model based on the gradient(s) received at block 752. In some implementations, the global model may be a global ASR model. The system can update the weight(s) of the global ASR model based on any gradient(s) received at block 752 that are generated based on the instances of the method 400 of FIG. 4. In some additional and/or alternative implementations, the global model may be a global TTS generator model. The system can update the weight(s) of the global TTS model based on any gradient(s) received at block 752 that are generated based on the instances of the method 600 of FIG. 6. Iterations of blocks 752 and 754 can continue to be performed as new gradient(s) are received and/or are queued after being received.

At block 756, the system at least periodically determines whether one or more conditions are satisfied, such as one or more of the conditions described herein (e.g., with respect to the update distribution engine 164 of FIGS. 1A and 1B). Generally, the condition(s) serve as a proxy for determining whether the global model has been updated to an extent that justifies utilization of network resources in transmitting updated weight(s) for the global model and/or the updated global model itself. In other words, the condition(s) are used as a proxy for determining if the performance gains of the model justify the usage of network resources. If so, the system proceeds to block 758 and transmits, to a plurality of client devices, current updated global weight(s) and/or a current updated global model itself. The updated weight(s) and/or the updated global model can optionally be transmitted to a given client device responsive to a request from the given client device, such as a request during an update procedure and/or a request sent due to the client device being idle and/or charging.

Figure 8:
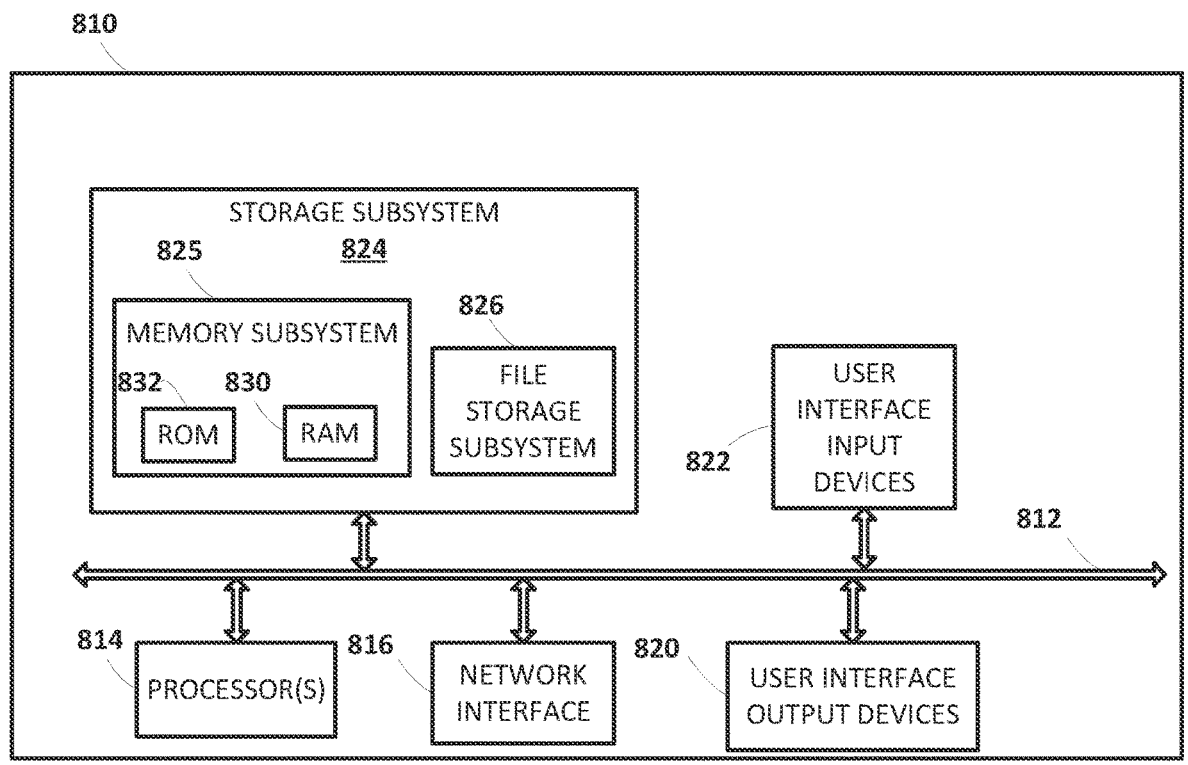
FIG. 8 illustrates an example architecture of a computing device, in accordance with various implementations.

Turning now to FIG. 8, a block diagram of an example computing device 810 that may optionally be utilized to perform one or more aspects of techniques described herein is depicted. In some implementations, one or more of a client device, cloud-based automated assistant component(s), and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIGS. 1A, 1B, and 2.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple buses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes training, based on a plurality of training instances, an on-device text-to-speech (TTS) generator model. The on-device TTS generator model is a portion of a generative adversarial network (GAN) model stored locally at the client device, where the GAN model also includes an on-device TTS discriminator model. Training the TTS generator model includes training the on-device TTS generator model to generate synthesized speech audio data that includes voice characteristics of the user of the client device. The method further includes, subsequent to training the on-device TTS generator model, identifying a textual segment stored locally at the client device of a user, processing, using the trained on-device TTS generator model stored locally at the client device, the textual segment to generate additional synthesized speech audio data that includes synthesized speech corresponding to the textual segment, processing, using an on-device automatic speech recognition (ASR) model stored locally at the client device, the additional synthesized speech audio data to generate a corresponding predicted ASR output, generating a gradient based on comparing the corresponding predicted ASR output to ground truth output corresponding to the textual segment, and updating local weights of the on-device ASR model based on the generated gradient.

These and other implementations of technology disclosed herein can optionally include one or more of the following features.

In some implementations, the plurality of training instances may be generator training instances, and each of the plurality of training instances include training instance input and training instance output. The training instance input may include a given textual segment stored locally at the client device, and the training instance output may include a ground truth label. Training the on-device TTS generator model stored locally at the client device based on a given training instance, of the plurality of training instances, may include processing, using the on-device TTS generator model, the given textual segment to generate predicted synthesized speech audio data that includes predicted synthesized speech corresponding to the given textual segment, processing, using the on-device TTS discriminator model, the predicted synthesized speech audio data to predict whether it corresponds to an actual spoken utterance of the user of the client device or the predicted synthesized speech generated by the on-device TTS generator model, and generating, based on the ground truth label and based on processing using the on-device TTS discriminator model, a loss. In some versions of those implementations, the training instance output may further include ground truth audio data that includes a given spoken utterance of the user that corresponds to the given textual segment. Training the on-device TTS generator model stored locally at the client device based on the given training instance, of the plurality of training instances, may further include comparing the predicted synthesized speech audio data that includes the predicted synthesized speech to the ground truth audio data that includes the given spoken utterance of the user, and generating, based on comparing the predicted synthesized speech audio data to the ground truth audio data, an additional loss. In some additional or alternative versions of those implementations, comparing the predicted synthesized speech audio data to the ground truth audio data includes comparing acoustic features of the ground truth audio data to synthesized acoustic features of the predicted synthesized speech audio data. In some additional or alternative versions of those implementations, the method may further include updating the on-device TTS generator model based one or more of the loss or the additional loss. Updating the on-device TTS generator model based one or more of the loss or the additional loss may include backpropagating one or more of the loss or the additional loss across the on-device TTS generator model.

In some implementations, the method may further include, prior to training the on-device TTS generator model, training, based on a plurality of additional training instances, the on-device TTS discriminator model. In some versions of those implementations, the plurality of additional training instances may be discriminator training instances, and each of the plurality of additional training instances may include additional training instance input and additional training instance output. The additional training instance input may include given audio data that includes a given spoken utterance of the user of the client device or synthesized speech audio data that includes synthesized speech generated by the on-device TTS generator model, and the training instance output may include a ground truth label that indicates whether the additional training instance input corresponds to the given audio data or the synthesized speech audio data. Training the on-device TTS discriminator model stored locally at the client device based on a given training instance, of the plurality of additional training instances, may include processing, using the on-device TTS discriminator model, the given training instance input to predict whether it corresponds to an actual spoken utterance of the user of the client device or the synthesized speech generated by the on-device TTS generator model, generating, based on the ground truth label and based on the processing using the on-device TTS discriminator model, a loss, and updating the on-device TTS discriminator model based on the loss.

In some implementations, the voice characteristics of the user of the client device may include prosodic properties of a voice of the user, where the prosodic properties of the voice of the user comprise one or more of: intonation, tone, stress, rhythm, tempo, and pause.

In some implementations, the method may further include transmitting, over a network and to a remote system, the generated gradient to the remote system without transmitting any of: the additional textual segment, the additional synthesized speech audio data, and the corresponding predicted ASR output. The remote system may utilize the generated gradient, and additional gradients from additional client devices, to update global weights of a global ASR model. In some versions of those implementations, the method may further include receiving, at the client device and from the remote system, the global ASR model or the updated global weights. Receiving the global ASR model or the updated global weights may be subsequent to the remote system updating the global weights of the global ASR model based on the gradient and the additional gradients. The method may further include, responsive to receiving the global ASR model or the updated global weights, replacing, in local storage of the client device, the on-device ASR model with the global ASR model or the local weights of the on-device ASR model with the updated global weights of the global ASR model.

In some implementations, a method implemented by one or more processors is provided, and includes identifying a textual segment stored locally at the client device of a user, processing, using a trained on-device text-to-speech (TTS) generator model stored locally at the client device, the textual segment to generate synthesized speech audio data that includes synthesized speech corresponding to the textual segment, processing, using a trained on-device TTS discriminator model stored locally at the client device, the synthesized speech audio data that includes synthesized speech corresponding to the textual segment to determine whether the synthesized speech corresponds to the synthesized speech audio data generated by the trained on-device TTS generator model or a spoken utterance of the user of the client device, generating a gradient based on the processing by the trained on-device TTS discriminator model, and updating local weights of the on-device TTS model based on the generated gradient.

These and other implementations of technology disclosed herein can optionally include one or more of the following features.

In some implementations, the method may further include transmitting, over a network and to a remote system, the generated gradient to the remote system without transmitting any of: the textual segment, and the synthesized speech audio data. The remote system may utilize the generated gradient, and additional gradients from additional client devices, to update global weights of a global TTS model.

In some versions of those implementations, the method may further include identifying ground truth audio data corresponding to a given spoken utterance of the user, the textual segment being a ground truth textual segment for the ground truth audio data, and generating an additional gradient based on comparing the synthesized speech audio data and the ground truth audio data. Updating the local weights of the on-device TTS model may be further based on the generated additional gradient. Transmitting, over the network and to the remote system, the generated gradient to the remote system may further include transmitting the generated additional gradient without transmitting the ground truth audio data. In some further versions of those implementations, the method may further include determining whether to transmit the generated additional gradient to the remote system. Determining whether to transmit the generated additional gradient to the remote system may include determining whether the ground truth audio data utilized in generating the additional gradient captures one or more of: additional audio data corresponding to a portion of an additional utterance of an additional user, or ambient noise that satisfies a noise threshold. The method may further include, in response to determining the ground truth audio data utilized in generating the additional gradient captures the additional audio data corresponding to the portion of the additional utterance of the additional user, or the ambient noise that satisfies the noise threshold, refraining from transmitting the additional generated gradient to the remote system to update the global weights of a global TTS model. In some additional or alternative further versions of those implementations, the method may further include determining whether the ground truth audio data utilized in generating the additional gradient captures one or more of: additional audio data corresponding to a portion of an additional utterance of an additional user, or ambient noise that satisfies a noise threshold, and, in response to determining the ground truth audio data utilized in generating the additional gradient captures the additional audio data corresponding to the portion of the additional utterance of the additional user, or the ambient noise that satisfies the noise threshold, and prior to generating the gradient, filtering the ground truth audio data to remove the additional audio data corresponding to the portion of the additional utterance of the additional user, or the ambient noise.

In some additional or alternative versions of those implementations, the method may further include receiving, at the client device and from the remote system, the updated global TTS model or the updated global weights. Receiving the global TTS model or the updated global weights is subsequent to the remote system updating the global weights of the global TTS model based on the gradient and the additional gradients. The method may further include, responsive to receiving the global TTS model or the updated global weights, replacing, in local storage of the client device, the on-device TTS model with the global TTS model or local weights of the on-device TTS model with the updated global weights.

In some additional or alternative versions of those implementations, the global TTS model may be one of a plurality of disparate global TTS models that correspond to a plurality of distinct languages, and the global TTS model, of the plurality of disparate TTS models, may correspond to a given language, of the plurality of distinct languages, associated with the user of the client device.

In some additional or alternative versions of those implementations, the global TTS model may be one of a plurality of disparate global TTS models that correspond to a plurality of distinct geographical regions, and the global TTS model, of the plurality of disparate TTS models, may correspond to a given geographical region, of the plurality of distinct geographical regions, associated with the user of the client device.

In some implementations, the method further includes generating, based on the textual segment, a plurality of alternate textual segments that are semantically diverse from the textual segment, processing, using the on-device TTS generator model stored locally at the client device, a given alternate segment, of the plurality of alternate textual segments, to generate alternate synthesized speech audio data that includes alternate synthesized speech corresponding to the given alternate textual segment, identifying additional ground truth audio data corresponding to an alternate spoken utterance of the user of the client device, the alternate textual segment being a ground truth alternate textual segment for the additional ground truth audio data, comparing the synthesized speech audio data to the ground truth audio data, generating an additional gradient based on comparing the alternate synthesized speech audio data to the additional ground truth audio data, and further updating one or more the local weights of the on-device TTS generator model based on the generated additional gradient.

In some implementations, a method implemented by one or more processors is provided, and includes identifying a textual segment stored locally at the client device of a user, processing, using a trained on-device text-to-speech (TTS) generator model stored locally at the client device, the textual segment to generate synthesized speech audio data that includes synthesized speech corresponding to the textual segment, processing, using a trained on-device TTS discriminator model stored locally at the client device, the synthesized speech audio data that includes synthesized speech corresponding to the textual segment to determine whether the synthesized speech corresponds to the synthesized speech audio data generated by the trained on-device TTS generator model or a spoken utterance of the user of the client device, generating a gradient based on the processing by the trained on-device TTS discriminator model, and transmitting, over a network and to a remote system, the generated gradient to the remote system, wherein the remote system utilizes the generated gradient, and additional gradients from additional client devices, to update global weights of a global TTS model.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors of a client device, the method comprising:
    identifying a textual segment stored locally at the client device;
    processing, using a trained on-device text-to-speech (TTS) model stored locally in local storage of the client device, the textual segment to generate synthesized speech audio data that includes synthesized speech corresponding to the textual segment;
    identifying ground truth audio data that captures a given spoken utterance, the textual segment being a ground truth textual segment for the ground truth audio data;
    generating a gradient based on comparing the synthesized speech audio data and the ground truth audio data;
    updating local weights of the on-device TTS model based on the generated gradient;
    determining whether the ground truth audio data captures an additional spoken utterance, the additional spoken utterance being in addition to the given spoken utterance; and
    in response to determining that the ground truth audio data does not capture an additional spoken utterance:
        transmitting, over a network and to a remote system, the generated gradient to the remote system without transmitting any of: the textual segment, and the synthesized speech audio data, wherein the remote system utilizes the generated gradient, and additional gradients from additional client devices, to update global weights of a global TTS model.

2. The method of claim 1, further comprising:
    determining whether the ground truth audio data captures ambient noise that is above an ambient noise threshold; and
    wherein transmitting the generated gradient to the remote system is further in response to determining that the ground truth audio data does not capture ambient noise that is above the ambient noise threshold.

3. The method of claim 1, further comprising:
    determining whether the ground truth audio data captures ambient noise that is above an ambient noise threshold; and
    in response to determining the ground truth audio data captures ambient noise that satisfies an ambient noise threshold, and prior to generating the gradient:
        filtering the ground truth audio data to remove the ambient noise.

4. The method of claim 1, further comprising:
    in response to determining that the ground truth audio data captures an additional spoken utterance:
        refraining from transmitting, over a network and to a remote system, the generated gradient to the remote system.

5. The method of claim 1, further comprising:
    in response to determining the ground truth audio data captures the additional spoken utterance, and prior to generating the gradient:
        filtering the ground truth audio data to remove the additional spoken utterance.

6. The method of claim 1, further comprising:
    receiving, at the client device and from the remote system, the updated global TTS model or the updated global weights of the updated global TTS model, wherein receiving the updated global TTS model or the updated global weights of the updated global TTS model is subsequent to the remote system updating the global weights of the global TTS model based on the gradient and the additional gradients; and
    responsive to receiving the updated global TTS model or the updated global weights of the updated global TTS model:
        replacing, in the local storage of the client device, the on-device TTS model with the updated global TTS model; or
        replacing, in the local storage of the client device, the local weights of the on-device TTS model with the updated global weights of the updated global TTS model.

7. The method of claim 1, wherein the global TTS model is one of a plurality of disparate global TTS models that correspond to a plurality of distinct languages, and wherein the global TTS model, of the plurality of disparate TTS models, corresponds to a given language, of the plurality of distinct languages.

8. The method of claim 1, wherein the global TTS model is one of a plurality of disparate global TTS models that correspond to a plurality of distinct geographical regions, and wherein the global TTS model, of the plurality of disparate TTS models, corresponds to a given geographical region, of the plurality of distinct geographical regions.

9. A client device comprising:
at least one processor; and
memory storing instructions that, when executed by the at least one processor, cause the at least one processor to:
identify a textual segment stored locally at the client device;
process, using a trained on-device text-to-speech (TTS) model stored locally in local storage of the client device, the textual segment to generate synthesized speech audio data that includes synthesized speech corresponding to the textual segment;
identify ground truth audio data that captures a given spoken utterance, the textual segment being a ground truth textual segment for the ground truth audio data;
generate a gradient based on comparing the synthesized speech audio data and the ground truth audio data;
update local weights of the on-device TTS model based on the generated gradient;
determine whether the ground truth audio data captures ambient noise that is above an ambient noise threshold;
in response to determining that the ground truth audio data does not capture ambient noise that is above the ambient noise threshold:
transmit, over a network and to a remote system, the generated gradient to the remote system without transmitting any of: the textual segment, and the synthesized speech audio data, wherein the remote system utilizes the generated gradient, and additional gradients from additional client devices, to update global weights of a global TTS model.

10. The client device of claim 9, wherein the instructions further cause the at least one processor to:
in response to determining that the ground truth audio data captures ambient noise that is above an ambient noise threshold:
refrain from transmitting, over a network and to a remote system, the generated gradient to the remote system.

11. The client device of claim 9, wherein the instructions further cause the at least one processor to: determine whether the ground truth audio data captures an additional spoken utterance, the additional spoken utterance being in addition to the given spoken utterance; wherein transmitting the generated gradient to the remote system is further in response to determining that the ground truth audio data does not capture an additional spoken utterance.

12. The client device of claim 9, wherein the instructions further cause the at least one processor to:
determine whether the ground truth audio data captures ambient noise that is above the ambient noise threshold and/or whether the ground truth audio data captures an additional spoken utterance; and
in response to determining the ground truth audio data captures ambient noise that satisfies the ambient noise threshold and/or in response to determining the ground truth audio data captures an additional spoken utterance, and prior to generating the gradient:
filter the ground truth audio data to remove the ambient noise and/or the additional spoken utterance.

13. A non-transitory computer-readable storage medium storing instructions that, when executed by at least one processor of a client device, cause the at least one processor of the client device to perform operations, the operations comprising:
identifying a textual segment stored locally at the client device;
processing, using a trained on-device text-to-speech (TTS) model stored locally in local storage of the client device, the textual segment to generate synthesized speech audio data that includes synthesized speech corresponding to the textual segment;
identifying ground truth audio data that captures a given spoken utterance, the textual segment being a ground truth textual segment for the ground truth audio data;
generating a gradient based on comparing the synthesized speech audio data and the ground truth audio data;
updating local weights of the on-device TTS model based on the generated gradient; and
transmitting, over a network and to a remote system, the generated gradient to the remote system without transmitting any of: the textual segment, and the synthesized speech audio data, wherein the remote system utilizes the generated gradient, and additional gradients from additional client devices, to update global weights of a global TTS model resulting in an updated global TTS model.

14. The non-transitory computer-readable storage medium of claim 13, the operations further comprising:
determining whether the ground truth audio data captures an additional spoken utterance, the additional spoken utterance being in addition to the given spoken utterance,
wherein transmitting the generated gradient to the remote system is in response to determining that the ground truth audio data does not capture the additional spoken utterance.

15. The non-transitory computer-readable storage medium of claim 13, the operations further comprising:
determining whether the ground truth audio data captures ambient noise that is above an ambient noise threshold,
wherein transmitting the generated gradient to the remote system is in response to determining that the ground truth audio data does not capture ambient noise that is above the ambient noise threshold.

16. The non-transitory computer-readable storage medium of claim 13, the operations further comprising:
receiving, at the client device and from the remote system, the updated global TTS model or the updated global weights of the updated global TTS model, wherein receiving the updated global TTS model or the updated global weights of the updated global TTS model is subsequent to the remote system updating the global weights of the global TTS model based on the gradient and the additional gradients; and
responsive to receiving the updated global TTS model or the updated global weights of the updated global TTS model:
replacing, in the local storage of the client device, the on-device TTS model with the updated global TTS model; or
replacing, in the local storage of the client device, the local weights of the on-device TTS model with the updated global weights of the updated global TTS model.

17. The non-transitory computer-readable storage medium of claim 13, wherein the global TTS model is one of a plurality of disparate global TTS models that correspond to a plurality of distinct languages, and wherein the global TTS model, of the plurality of disparate TTS models, corresponds to a given language, of the plurality of distinct languages.

18. The non-transitory computer-readable storage medium of claim 13, wherein the global TTS model is one of a plurality of disparate global TTS models that correspond to a plurality of distinct geographical regions, and wherein the global TTS model, of the plurality of disparate TTS models, corresponds to a given geographical region, of the plurality of distinct geographical regions.

* * * * *